United States Patent [19]
Asthana et al.

[11] Patent Number: 5,265,006
[45] Date of Patent: Nov. 23, 1993

[54] DEMAND SCHEDULED PARTIAL CARRIER LOAD PLANNING SYSTEM FOR THE TRANSPORTATION INDUSTRY

[75] Inventors: Ajay K. Asthana, Chicago, Ill.; Subhash Gupta, Minnetonka; Ravi Mehrotra, Bloomington, both of Minn.; Sharad Singhal, Chicago, Ill.

[73] Assignee: Andersen Consulting, Chicago, Ill.

[21] Appl. No.: 633,960

[22] Filed: Dec. 26, 1990
(Under 37 CFR 1.47)

Related U.S. Application Data

[63] Continuation-in-part of Ser. No. 627,824, Dec. 14, 1990.

[51] Int. Cl.⁵ .............................................. G06F 15/20
[52] U.S. Cl. ..................................................... 364/401
[58] Field of Search .............................. 364/401–407, 364/DIG. 1, DIG. 2; 379/89

[56] References Cited

U.S. PATENT DOCUMENTS

| | | |
|---|---|---|
| 3,711,862 | 1/1973 | Story . |
| 3,979,731 | 9/1976 | Naplatanov et al. . |
| 4,360,875 | 11/1982 | Behnke . |
| 4,832,204 | 5/1989 | Handy et al. . |
| 4,888,692 | 12/1989 | Gupta et al. . |
| 5,051,914 | 9/1991 | Sansone et al. . |
| 5,112,959 | 6/1992 | Nathanson et al. . |
| 5,168,451 | 12/1992 | Bolger . |

OTHER PUBLICATIONS

*Transportation/Travel Management & Services*, Datapro Information Services Group, Sep. 1992.
*Data Sources ®*, Software, 1st Edition, vol. 2, pp. J-21-5-J-224, 1990.

*Primary Examiner*—Robert L. Richardson
*Attorney, Agent, or Firm*—Merchant, Gould, Smith, Edell, Welter & Schmidt

[57] ABSTRACT

Method and apparatus for a demand scheduled partial carrier load planning system for the transportation industry, designed to distribute planned and random orders, each order having a source point and a destination point in the territory served, and for distributing products and materials in a predetermined geographic territory, primarily intended for use in connection with wheeled vehicles traveling over public highways.

48 Claims, 10 Drawing Sheets

THIS TUBE IS AT ANGLE OF Q DEGREES, IS CORRIDOR 0 AT THIS ANGLE, AND HAS A DIRECTION OF −1 (SOUTHWEST)
FIG. 5
FIG. 6
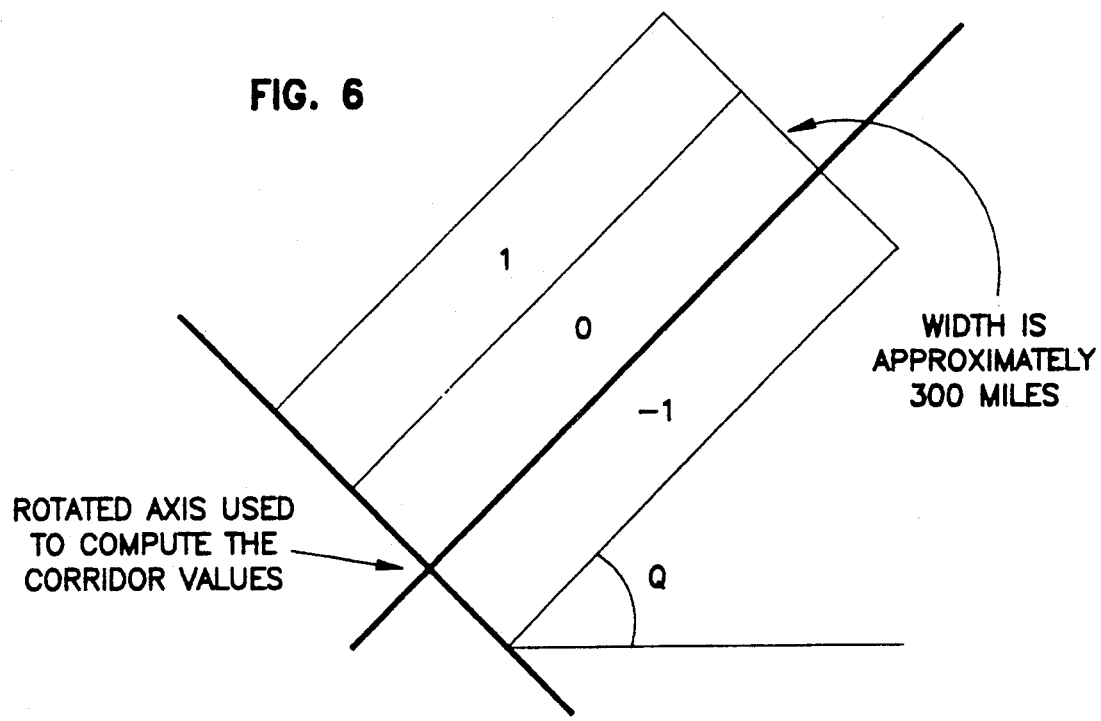

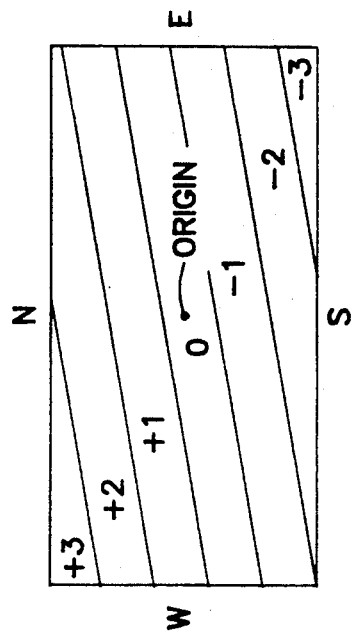
10° TUBES FIG. 6B
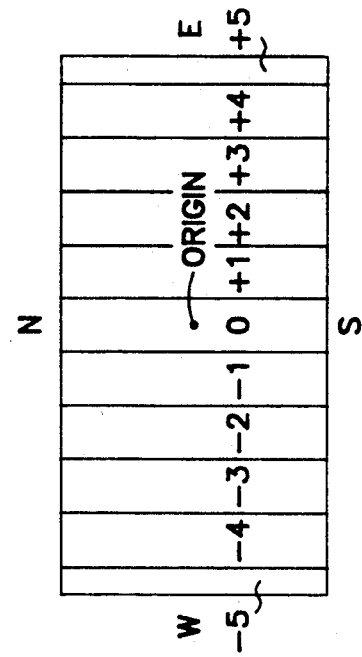
90° TUBES FIG. 6D
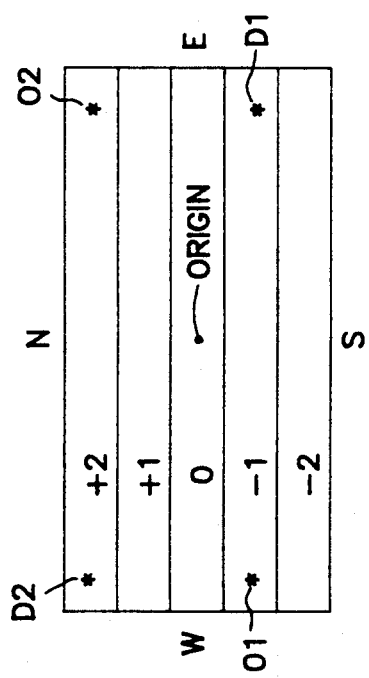
0° TUBES FIG. 6A
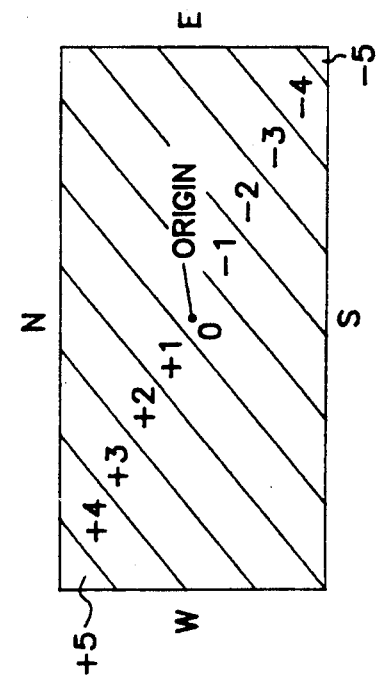
40° TUBES FIG. 6C

10° TUBES

0° TUBES

| FROM AREA (EXCESS) | TO AREA (SHORTAGE) | VOLUME (CUBES) |
|---|---|---|
| 1,1 | 3,4 | 50,000 |
| 1,2 | 3,4 | 70,000 |
| 9,10 | 5,8 | 10,000 |
| 9,11 | 9,3 | 20,000 |
| 9,11 | 11,4 | 52,000 |
| 9,11 | 9,2 | 23,000 |

# DEMAND SCHEDULED PARTIAL CARRIER LOAD PLANNING SYSTEM FOR THE TRANSPORTATION INDUSTRY

CONTINUATION DATA

Continuation-in-part of U.S. Ser. No. 07/627,824 filed Dec. 14, 1990 entitled, "A Demand Scheduled Partial Carrier Load Planning System for the Transportation Industry," by Asthana et al.

TECHNICAL FIELD OF THE INVENTION

This invention relates to a system and a method for improved load planning and transportation for a demand scheduled partial carrier load planning system.

BACKGROUND OF THE INVENTION

The goods and package transport industry can be divided into several segments, each offering services that satisfy different customer needs. At the one end of the transport industry spectrum, a single customer order may fill an entire carrier. At the other end of the spectrum are parcel delivery services, where a carrier transports hundreds of individual small loads or packages. The present invention is focused on the segment of the transport industry that falls somewhere between these two extremes. In particular, it addresses the transport problems associated with transporting large orders in large moving vans, as commonly encountered, for example, in the transport of household goods. The present system specifically addresses the situation where a van is assigned to pick up several orders from different customer locations and deliver each order to a different destination. The remainder of this document will discuss application of the present invention to this particular segment of the transport industry, hereinafter referred to as "the moving industry."

In the moving industry, a customer places an order to move goods from an origin to a destination. A van is assigned to pick up the order and deliver it to the requested destination. Typically, most orders occupy only a fraction of the available space on the van and multiple orders must be consolidated to form a full load. Within the moving industry, it is common to combine on an average approximately four to ten orders into a load for a single van.

If the assigned van cannot pick up the order, a local van picks up the order from the customer and stores it in a warehouse. This process is known as a "pick up and store." Later, an assigned van picks up the order from the warehouse and delivers it to the destination. Pick up and store involves extra expenses and double handling and is generally discouraged. However, this technique can be used to reduce variation in demand for vans. During slow periods, vans are assigned to deliver pick up and store orders. During busy periods, the technique can reduce the overall demand for vans. However, use of pick up and store procedures is always limited by customer scheduling constraints.

The volume of orders vary daily, weekly, and seasonally. To add to the complexity of the problem, several kinds of vans may be used. Vans can be owned outright or leased on a short term basis. The matching of a van to an order is based on the type of load and the distance it has to be carried.

Transportation companies turn away tonnage each year, despite the fact that their average van utilization is low. This is because vans are not in the right place at the right time and the load consolidation strategy, which combines smaller orders into a van load, does not maximize van utilization.

In essence, the problems is one of meeting customer scheduling demands, while minimizing the operating costs. Although, the problem sounds simple, it is complicated by the business dynamics, such as, last-minute orders, changes to existing orders, order cancellations, van delays, van breakdowns, etc. The equation is further complicated due to restrictions imposed by the Government (i.e., maximum time drivers can be on the road per day, inter and intra state regulations, etc.).

Traditional approaches such as Linear Programming cannot provide real-time decision support. Because of constant fluctuations of orders and lack of precise information on the position of vans, planning using linear programming is impractical.

SUMMARY OF THE INVENTION

The present invention provides a system utilizing a the Structured Decision Analysis (SDA), which hierarchically decomposes the problem into different levels of abstraction. The planning effort at each abstraction level is proportional to the expected payoffs. SDA capitalizes on the hierarchical, temporal, and statistical structure inherent in most large-scale optimization problems. Using the structure simplifies the solution by providing constraints in a hierarchical fashion, with higher level decisions becoming constraints to lower level operations. By exploiting structure at analysis time rather than trying to remove it at decision making (execution) time, it can handle greater degrees of freedom without sacrificing the optimal solution.

In order to reduce the complexity, the geographic service region was divided into tubular regions (space-time tubes) so that those orders which are moving in the same or nearly the same direction are grouped together. These tubes are also divided in time so that orders which are "close" to each other in space and time are also grouped together. All orders in one tube are considered at one time.

To organize the vans in a logical and easily accessible manner, the country is also divided into areas (geographical-time areas). Areas are rectangular in size based on curvature of the Earth at different latitudes. Every van is assigned to a particular area. Vans are always associated with an area, for example during loading and unloading, travelling through an area and while waiting empty.

Local predictions of van locations over time are necessary to the system so that strategies can be adjusted over time in order to react to minor fluctuations in the order requirements and van capacities. Also, the local van prediction facility provides the end-user with the ability to find out where particular resource will be available days before the equipment is actually available.

Unfortunately, just providing a storage or organization mechanism for decomposing the problem is not enough. A hierarchy of decision making levels must be established to answer questions from the given data. The invention thus establishes three levels of decision making: global, communication, and local.

The global level focuses on making key decision at a strategic level so that problems which span multiple geographic areas or relatively longer periods of time can be addressed, such as, the trends in movements,
} forecasting or orders, policy decision, etc. The decisions made at this level are converted into parameters to be used by the local level as constraints on decision made at the local level.

The communications level is responsible for mapping, monitoring and collecting statistics. It passes the parameters from global down to local level and feeds back the current information from local to global. At the local level, the system follow the guidelines from higher levels for planning the consolidation of orders into loads, the assignment of these consolidated orders to vans, and the repositioning of empty capacity (vans) based on the constraints imposed by time frames and minimizing costs. Hence, the decisions made at the local level are consistent with the global objectives. Additionally, decisions are not constrained by the artificial boundaries traditionally based on managerial responsibility or geographic preferences. The dynamic nature of the above stated problem is embedded in the system.

BRIEF DESCRIPTION OF THE DRAWINGS

FIG. 5 illustrates a tube crossing the continental United States.

FIG. 6 illustrates a tube at an angle Q degrees, corridor 0 and a direction of −1 (Southwest).

FIG. 6A illustrates a series of zero degree tubes from adjacent corridors at the same angle.

FIG. 6B illustrates a series of 10 degree tubes from adjacent corridors at the same angle.

FIG. 6C illustrates a series of 40 degree tubes from adjacent corridors at the same angle.

FIG. 6D illustrates a series of 90 degree tubes from adjacent corridors at the same angle.

DETAILED DESCRIPTION OF THE INVENTION

The present invention comprises method and apparatus (sometimes referred collectively to herein as the "system") for use in distributing products and materials in a predetermined geographic territory. It is primarily intended for use in connection with wheeled vehicles traveling over public highways, but will work for other forms of transport. The system of the invention is designed to deal with the distribution of orders. Each order has a source point and a destination point in the territory served. Orders from a variety of locations are combined into loads. Furthermore, the system is designed to accommodate random orders on short notice.

SYSTEM AND DATA BASE STRUCTURE

Figure 1:
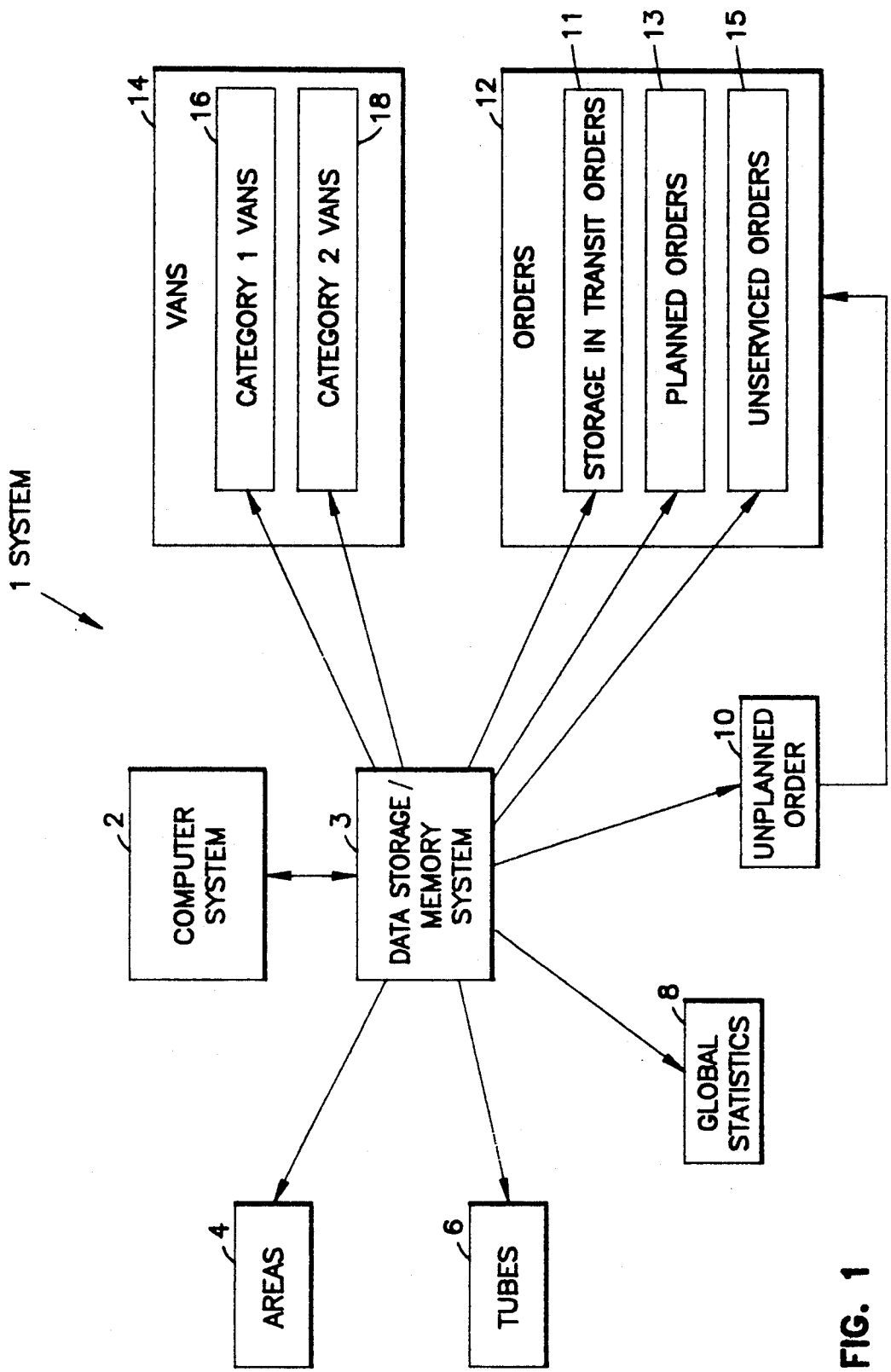
FIG. 1 is a system drawing including the computer system and logical data base design.

FIG. 1 is a simplified overview of the system 1 of the present invention, including the computer system 2 and its data storage/memory 3. Computer system 2 can be any conventional data processing system, having a CPU, terminals for the input and output of data, and peripherals for communications capabilities and other conventional functions. Computer system 2 further includes a data storage/memory 3 comprising mass storage and random access memory. The data storage/memory 3 holds a database specifying areas 4, tubes 6, global statistics 8, unplanned orders 10, orders 12 and vans 14, to be used in the system of the present invention. The software described herein is also stored in the mass storage/memory 3, and is executed on computer system 2.

Orders that can be handled by the system can be of several varieties. Unplanned orders 10 are "last minute" orders which may be scheduled dynamically. Storage in transit orders 11 represents orders that have been picked up from the customer location, but are placed in storage at a warehouse near the destination location. Planned orders 13 are those which are scheduled on a batch mode basis from a pool of available orders. Finally, unserviced orders 15 are those that have been planned, but have not yet been assigned to a carrier.

All orders are entered using the system terminals. Other information and data relating to operation and maintenance of the system, and data files, and system commands, are also entered using the terminals. The computer system 2 and the terminals may be located in the same location, with all users, or dispatchers, located in a central location from which the movement of the vans in the system are controlled by telephone or radio communication. Alternatively, the terminals can be distributed throughout several or many locations in the territory.

Carriers can be either vans owned by the moving company, Category 1 Vans 16, or vans leased to the moving company from local operators, Category 2 Vans 18. Since the availability of each van type varies, data storage/memory 3 maintains separate records for each. Areas 4 and tubes 6 data specify shipping travel paths and local areas throughout the territory, as described in more detail below. Global statistics 8 data is used to specify global data for the system. As indicated, further information on the data base design will be presented below in connection with the description of the invention. Further details on the structure of the data base is presented in Appendixes A, B and C, which are hereby incorporated herein by reference.

GEOGRAPHICAL-TIME AREAS

In order to organize the vans and orders in a logical and easily accessible manner, the United States and Canada are geographically divided into areas. Areas are roughly 300 miles by 300 miles in size, but vary based on the curvature of the Earth at different latitudes.

Figure 2:
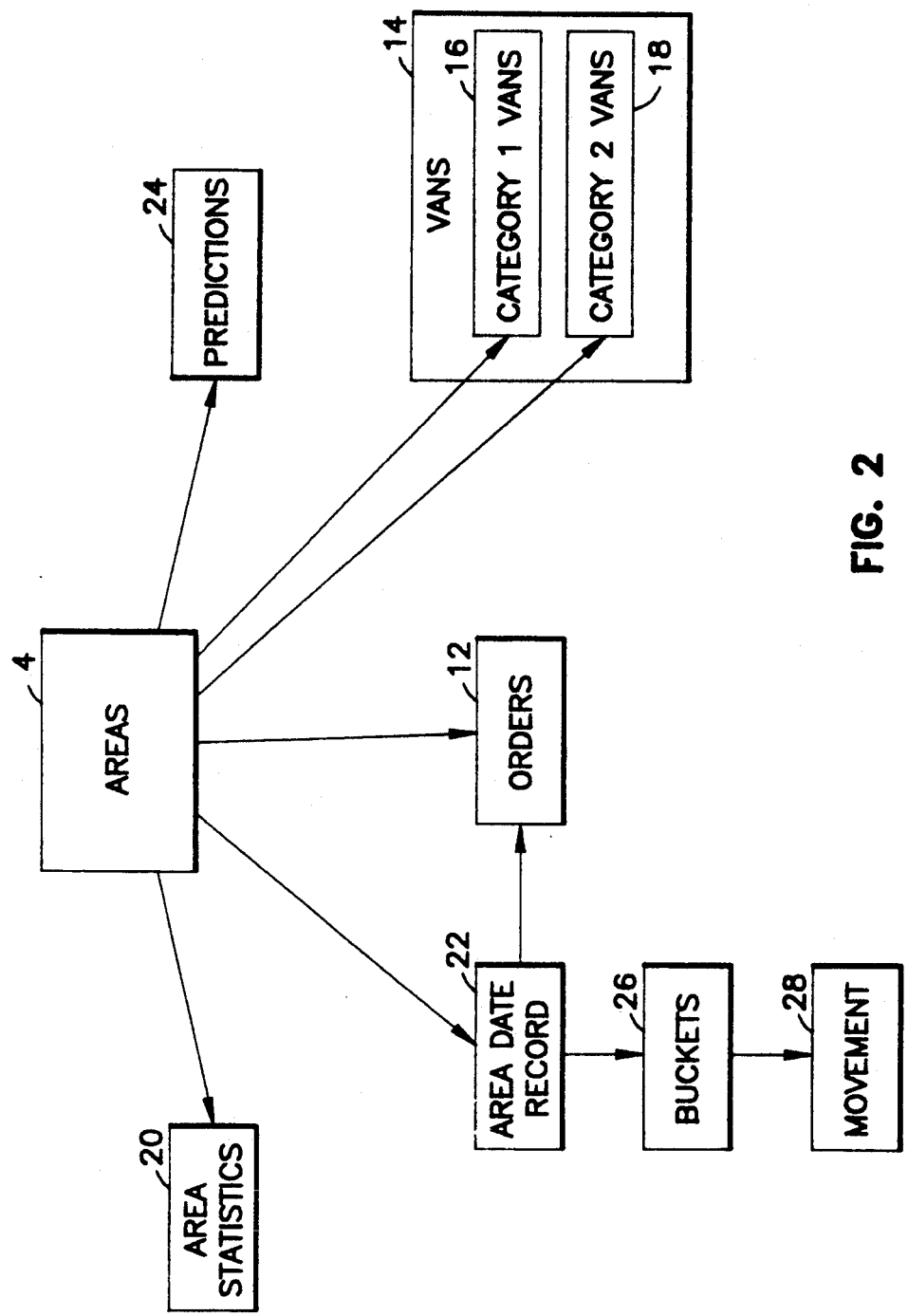
FIG. 2 is a logical data base design chart for area based functions.

FIG. 2 illustrates the logical data base flow of the areas. An area date record 22 is maintained for each area. The areas are divided by time so that it is possible to find out what orders 12 need to be loaded on a certain date or what vans 14 will be in an area on a certain date. Orders are grouped into buckets 26, according to loading date. Based on the loads in a bucket, the system determines the most efficient move sequence 28 to pick up the orders. Finally, area statistics 20 are maintained for use in the area prediction module 24.

The lowest level of time granularity used within the system when dividing areas is 1 day. There is no limit to the number of days of order or van information that can be associated with an area.

The areas are defined in such a way as to allow simple and fast calculation of what area an order or van is in. Every area is referred to by its row number and column number. For example, an area could be (10,11), meaning that the area is geographically in the 10th row and 11th column of areas in the system. The origin area (1,1) is located just north of the Equator and west of the Greenwich Meridian.

Figure 2A:
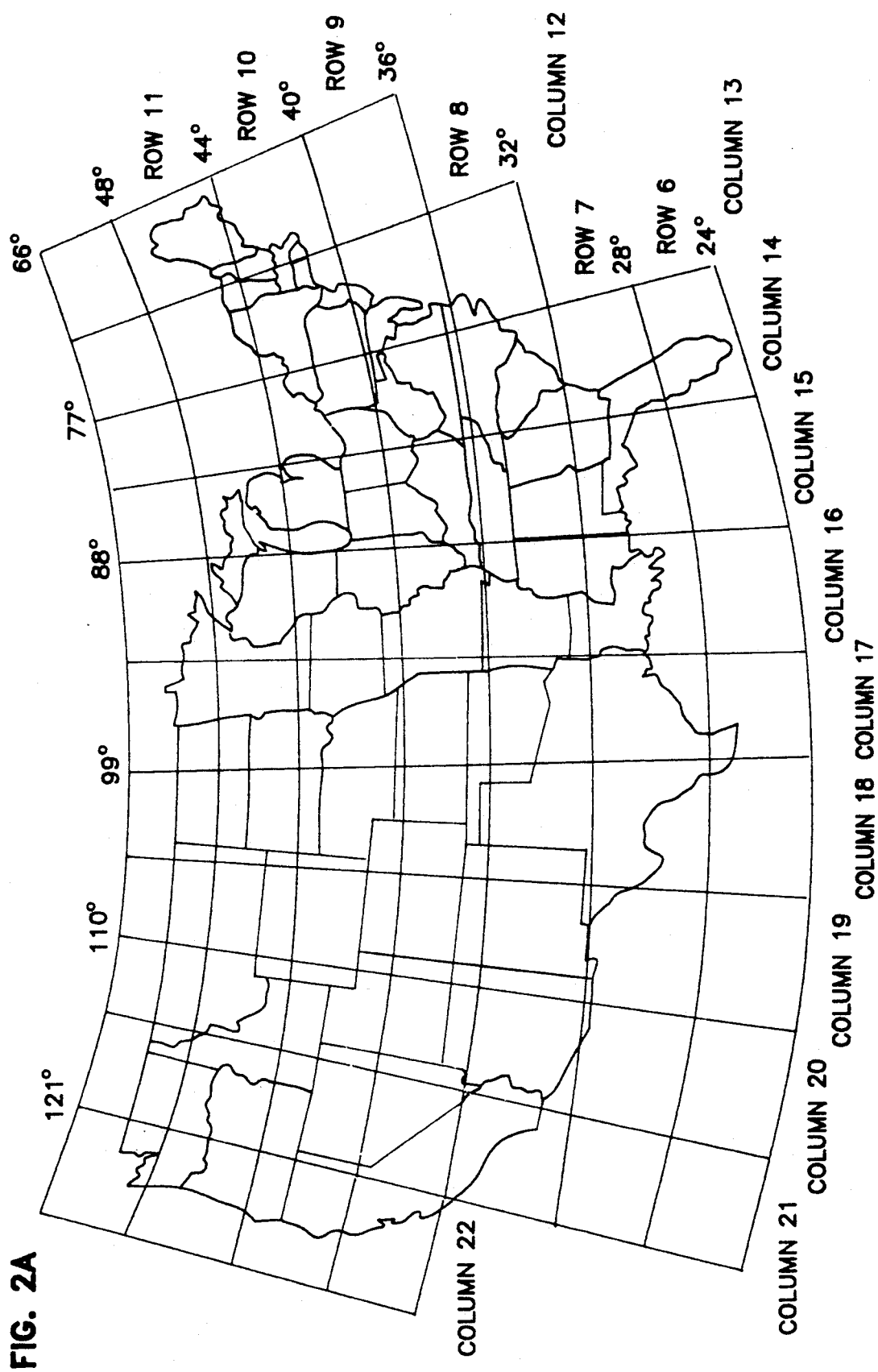
FIG. 2A illustrates the division of the United States into areas based on latitude and longitude.

The calculation of the rows and columns in FIG. 2A is based on longitude and latitude. The formula used in the present embodiment is:

Row = latitude/4.0

Column = longitude/5.5

For example, a latitude of 24° corresponds to row 6 (6 = 24/4.0). A latitude of 28° corresponds to row 7 (7 = 28/4.0). Longitude of 66° corresponds to column of 12 (12 = 66/5.5). Longitude of 71.5° corresponds to column of 13 (13 = 71.5/5.5).

The values of these parameters are based on order density and volumes in the United States. If the geographic distribution of orders changes significantly, it may be necessary to change these parameters in order for the system to continue to operate properly in a real-time environment. Roughly 100 areas exits in the continental United States and Canada.

Should it be necessary to modify the sizes of the areas it is possible to change these parameters and recompile all of the programs. After rerunning some initialization programs the system will work with the new area definitions.

NEIGHBORING AREAS

Figure 3:
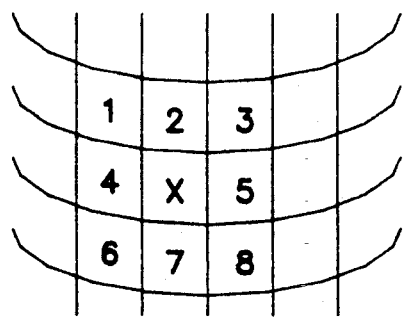
FIG. 3 illustrates the concept of adjacent areas.

Because of the low density of orders and vans in some portions of the country, such as in North Dakota, it was necessary to develop the concept of neighboring areas within the system. The concept of neighboring areas relates to geographic nearness of one area to another area. The system uses the concept of neighboring areas when van capacity or order volume is insufficient in one area. When either of these considerations are not meet, the resources of neighboring areas can be drawn upon. In the present embodiment, every area has eight neighboring areas. FIG. 3 shows the neighbors for any given area, X.

For example, after the system assigns loads in a given area to the vans in that area, some orders may remain unassigned. If no vans in that area can accommodate a particular unassigned order, the system will look to neighboring areas for vans that can handle the unassigned orders. This procedure is discussed below in connection with the Van Assignment module.

SPACE-TIME TUBES

In transportation problems the concept of direction of travel is important. The concept of tubes was developed to organize vans and orders so that those orders or vans which are moving in the same or nearly the same direction are grouped together. In order to further facilitate the organization and access process these tubes are divided by time so that vans and orders which are "close" to each other in space and time are also grouped together.

Figure 4:
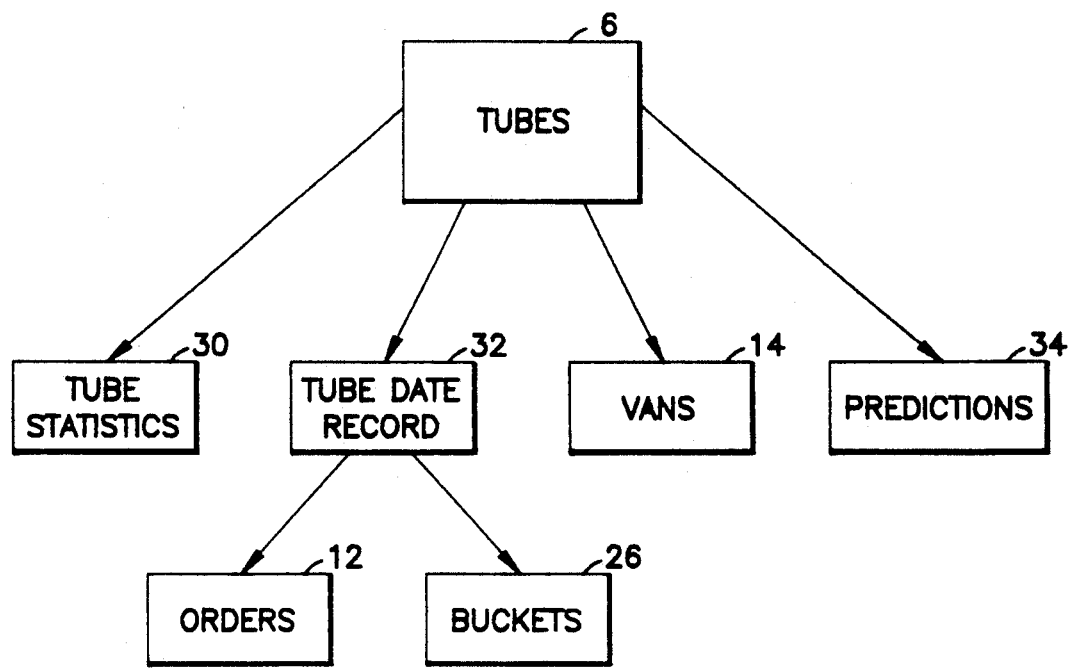
FIG. 4 is a logical data base design chart for tube based functions.

FIG. 4 illustrates the logical data base flow for the tubes. An tube date record 32 is maintained for each tube. The tubes are divided by time so that it is possible to find out where vans and orders 12 are in the tube. Finally, tube statistics 30 are maintained for use in the tube prediction module 34.

As with areas, tubes are defined in part in terms of geographical areas, primarily geographical swaths across the territory. In the example of the present embodiment, there are approximately 720 tubes within the system crisscrossing the continental United States and Canada, which cover the geographic territory. These tubes are used to classify and organize orders moving in the territory, primarily according to which tube the orders fall within. However, it should be realized that it is not necessary to use a tube system which provides a geographically defined tube path between every possible point of origin and destination, as will be explained further below.

A tube in the system is defined by three parameters: angle, corridor and direction. In the present embodiment of the system these parameters are defined as:

Angle: Tubes exits at angles from 0 to 180 degrees. In order to cover the entire country, tubes at every 10 degrees was chosen for this problem.

Corridor: Corridor parameters can be thought of as a way to differentiate tubes which are at the same angle, but are approximately parallel to each other. Since the width (i.e., corridor) of an individual tube does not cover the whole region, a series of parallel corridors (from which corresponding tubes are formed) are needed to cover the space. The tube corridor parameter is numbered from −20 to 20, depending upon where the "corridor" for the tube is located relative to a center corridor for tubes of the same angle.

Direction: The direction within a tube is given as either a +1 for going in the Northeast direction or −1 for going in the Southwest direction. When a tube is not going in either the direction, the system will assign the direction value (+1 or −1) based on if the direction of travel is closer to going North or East (+1) or South or West (−1).

Generally, the system according to the present invention provides that an order record identifies items to be transported from an origin to a destination point in the geographic territory. The system determines a vector representation of the path from the origin and destination points. This vector representation of the order path is matched to one and only one of the tubes in the system.

Specifically, the order record specifies the latitude and longitude of the origin and destination points of the order (as entered by an operator of the system). Preferably, all points are converted to an artificial coordinate system based on latitude and longitude. To match an order to a tube, the system first determines an orientation angle for the tube. For this purpose, the system uses an x-y coordinate system having its origin at the center of the territory, using longitude and latitude lines intersecting at the origin for the x-y axes. The orientation for the order vector is the angle of the vector with respect to the horizonal axis. Vector orientation angles are matched to the closest tube angle within a range of plus or minus 5 degrees of the tube angle. For example, the 0 degree tube encompasses a range of order vector angles from greater than or equal to −5 degrees to less than 5 degrees (−5≦angle<5). The 10 degree tube encompasses a range of order vectors from greater than or equal to 5 degrees to less than 15 degrees (5≦angle<15). Based on the orientation angle, the system matches the order vector to a tube of a particular angle.

Next, the system determines which of the tubes having the particular angle the order falls in. As indicated above, the corridor parameter indicates where a particular tube is relative to a parallel tube passing through the center of the coordinate system. If the angle of the particular tube is not close to 90 degrees, the system measures the distance from the origin point of the order vector to a parallel line passing through the origin of the coordinate system. If the tube is close to 90 degrees, the system measures the distance from the origin point of the order vector to the vertical reference axis. These distances are divided by the width of a tube as defined in the tube definition. The corridor parameter for the particular order is then determined by measuring how many incremental "tube widths" the origin of the order vector is from a parallel line passing through the coordinate system.

The direction parameter for the tube is based on the direction of travel necessary to move from the origin to the destination. If the angle of the tube with respect to the reference axis is not at 90 degrees, the system evaluates the longitude of the origin and destination. If the longitude of the origin is less than the longitude of the destination, a tube direction parameter of +1 is assigned, and vice versa. However, if the tube is at 90 degrees to the reference axis, the system evaluates the latitude of the origin and destination. If the latitude of the origin is less than the latitude of the destination, a tube direction parameter of +1 is assigned, and vice versa.

Figure 6F:
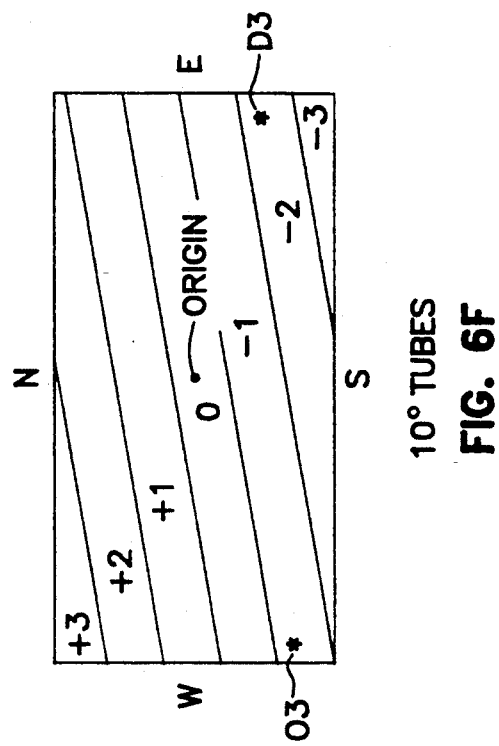
FIGS. 6E and 6F illustrate the situation where the origin and destination point of a particular order are not contained within the geographic confines of a single tube.
Figure 6E:
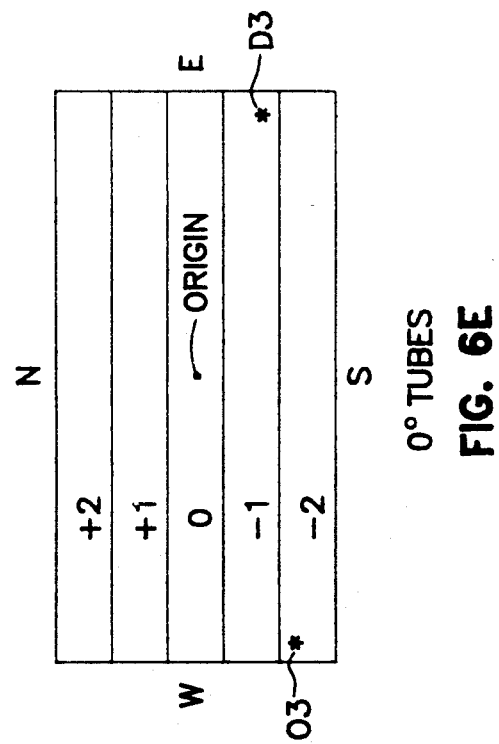

For certain tube configurations, for example the configuration of the present embodiment, it is possible that the geographic origin and destination of an order will not fall within the boundaries of any single tube defined by the system. FIG. 6E and 6F illustrate this situation. For example, an order having an origin point O3 and a destination point D3 is not entirely contained within the geographic confines of any one tube. It is not in the 0 degree tube (0, −2, +1), nor the 10 degree tube (1, −1, −1). However, the order would be assigned to exactly one tube according to the rules discussed above. In the example of the order going from O3 to D3, assume the order vector is at an angle of 4 degrees. According to the rules, it is assigned to the 0 degree tube, because the 0 degree tube encompasses order vectors with angles from greater than or equal to −5 degrees to less than 5 degrees (−5≦angle<5). The distance from the origin O3 to a parallel line passing through the origin indicates two "tube widths," resulting in a corridor parameter of −2. The resulting tube definition is (0, −2, +1).

It should be understood that a tube system can be defined such that there is a tube which will geographically contain the origin and destination of any possible order. For example, the tube angle increment in the example of the present embodiment could be reduced to 5 degrees, in which case the situation described above would not exist.

The tubes defined in the present embodiment are roughly 300 miles in width and at 10 degree increments from each other. However, the tube definition in the present embodiment is designed for a particular average order density and volume and a particular average number and availability of vans. Should the volume or density of orders change significantly, or the size of the fleet change significantly, it may be necessary to change the definition of tubes within this system. To change the definition of tubes, it is possible to modify the parameters for width, angles, and corridors and re-initialize the database.

For example, the granularity of the tube system can be altered by changing the width or the angle increment of the tubes. As tube width or angle increment decrease, the geographic region is divided into smaller pieces, providing greater granularity, as may be desired where there is a high density of orders in the territory. As tube width or angle increment increases, granularity decreases, as may be desired where order density is low.

FIG. 5 show how one tube might be defined which crosses part of the United States. The tube shown runs from the Northeast to the Southwest, represented by a direction parameter of −1. For every tube, there are other parallel tubes of the same angle Q but with different corridor parameters. FIG. 6 shows a tube of angle Q and adjacent tubes of corridor +1 and −1.

FIGS. 6A through 6D each comprise a rectangular area representing a simplified system form of the geographic territory of the Continental United States. The horizontal dimension of the system area is twice that of the vertical dimension, corresponding to the ratio of 1,500 to 3,000 miles, the approximate north/south and east/west dimensions of the Continental United States.

Referring now to FIG. 6A, it is seen that the system territory is divided into five "corridors," labeled −2 through +2. Each corridor in FIG. 6A has a width of 300 and a length of 3,000, and is at an angle of 0° with respect to a horizontal center axis running through the origin of the territory.

The above corridors, each with a positive and negative, form ten "tubes" according to the present invention. The tube identification scheme of the present invention provides that each tube is identified by an angle index a, a corridor index c, and a direction index d, namely: tube (a,c,d).

The angle index denotes the angle of the tube, i.e. the angle of the tube with respect to the "X" axis of a coordinate system centered on the origin of the territory. As noted above, the tubes of FIG. 6A have an angle of 0°. According to the convention of the present invention, a tube with the index a=0, denotes a 0° tube. As will be described in more detail below, a tube of angle 10° would have an a index of 1, a tube with an angle of 30° would have an a index of 3 and so forth, incrementing the a index for each 10° increment in tube angle. The "c" index denotes the corridor of interest within a group of corridors of the same angle index. The "d" index designates a direction for the tube. Thus, for example, tube(0,0,1) identifies the center area numbered "0" in FIG. 6A, with a west to east direction. The tube(0,0,−1) constitutes the same center area with an east to west direction. The tube(0,−2,1) identifies the bottom area of FIG. 6A numbered "−2" with a west to east direction.

Thus, tube (0,−1,1) would be used to move a load from the origin point $O_1$ to the destination point $D_1$ represented on FIG. 6A. Tube(0,2,−1) would be used to move a load from origin point $O_2$ to destination point $D_2$.

Referring now to FIGS. 6B and 6C, there are shown tubes at the 10° and 40° angles, respectively. The tubes represented in FIG. 6B are thus identified as tube(1,−3,1), tube(1,−2,1) . . . tube(1,3,1), and the directional opposites, i.e. tube(1,−3,−1) through tube(1,3,−1). The tubes in FIG. 6C are identified as follows: tube(4,−5,1) through tube(4,5,1) and the directional opposites tube(4,−5,−1) through tube(4,5,−1). FIG. 6D shows tubes at a 90° angle.

NEIGHBORING TUBES

Like areas, tubes also have neighbors. For example, the volume of van capacity or orders which are moving to or from a low density area, such as North Dakota, may be too small. By drawing upon the resources of neighboring tubes it may be possible to supply the van capacity necessary to service orders or provide orders for vans in a low volume tube.

Figure 7:
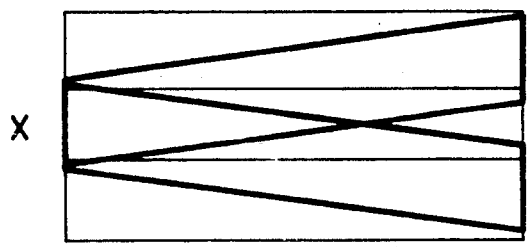
FIG. 7 illustrates the four neighboring tubes associate with each primary tube.

In the present embodiment of the system, each tube has 4 neighbors. FIG. 7 details what the neighboring tubes of tube X.

Note that the neighboring tube above and below tube X will be at the same angle as the primary tube X, but will be corridors C+1 and C−1. (angle, corridor +/−1, direction). The other neighboring tubes will be at an angle 10 degrees less and 10 degrees more than the angle of X with the same corridor values as X. (+/−10 angle, corridor, direction). The direction of all of the neighboring tubes of X will be the same as X, except when the angle is close to 90 degrees. The direction of the neighboring tubes computed by the system may not be the same as the primary tube in these circumstances.

LOCAL VAN PREDICTION

Local predictions of van locations over time are necessary to the system to adjust strategies and in order to react to minor fluctuations in the order requirements and van capacities. Also, the local van prediction facility provides the end user with the ability to find out what resources will be available and where, days before the equipment is actually available.

Local van predictions are made as accurately as possible, given the information known about the vans and their routing within the United States. Predictions of van locations or movement outside the continental United States may or may not be accurate.

Figure 8:
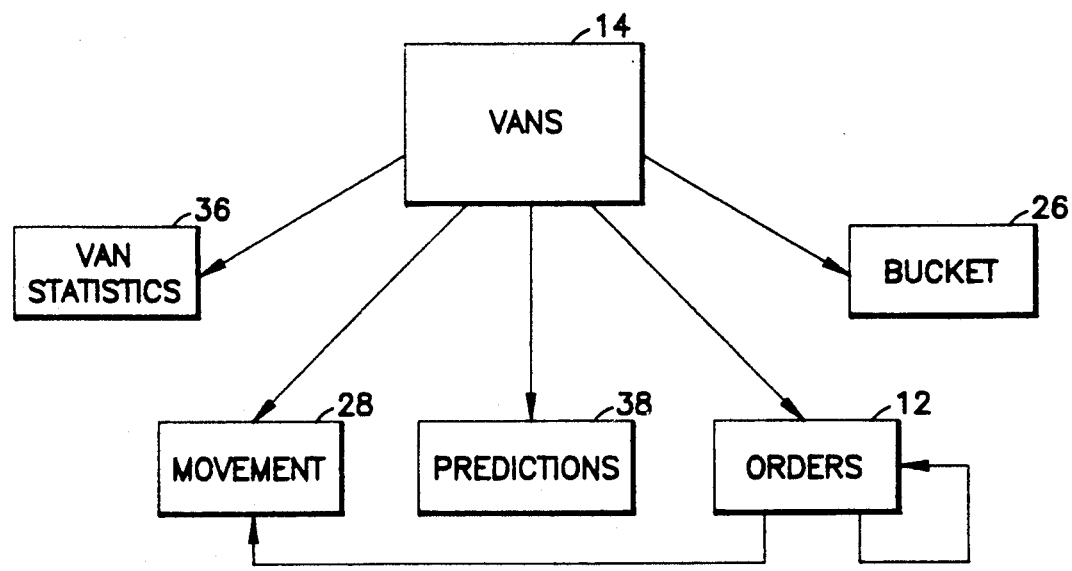
FIG. 8 is a logical data base design chart for van based functions.

FIG. 8 illustrates the logical data base flow for the vans 14. The local van predictions 38 predict the future location of vans (both the areas the vans will pass through as well as the tube in which the van is travelling) for 3 days. The value 3 is arbitrary, and the system will work with any value of 2 or more days. It should be noted, however, that predictions beyond a few days are inherently inaccurate, and may not accurately reflect a van's likely routing. The only effect changing the prediction window will have on the system is that it will either reduce or increase the hardware resource requirements for CPU and input/output operations.

In the present embodiment predictions 38 comprise two area and two tube predictions per day per van. Users can access the predictions and obtain a report by area or tube and date, in order to determine what vans are going to be in an area or passing through an area in a particular tube on a particular date.

The system uses a variety of van statistics 36 in making local van predictions. These include:

miles per half day, if the van is moving,
pounds per half day, if the van is loading,
pounds per half day, if the van is unloading,
hours per day.

The system uses these factors in addition to the last location and call in time of the van, the expected next location and call in time, and routing information concerning what needs to be picked up and delivered (where and when) to make the predictions.

PREDICTION OF AREAS

The prediction module 24 (FIG. 2) makes a prediction as to which area 4 a van will be in over a period of time, using the relevant data in the database. The present embodiment predicts the area location of each van twice per day. This is done so that should a van cross over an area during the day, users would still be able to query what vans would be passing through that area in a given day. Note that the system can predict one or two areas per day for the van to be in.

Figures 9, 10, 12:
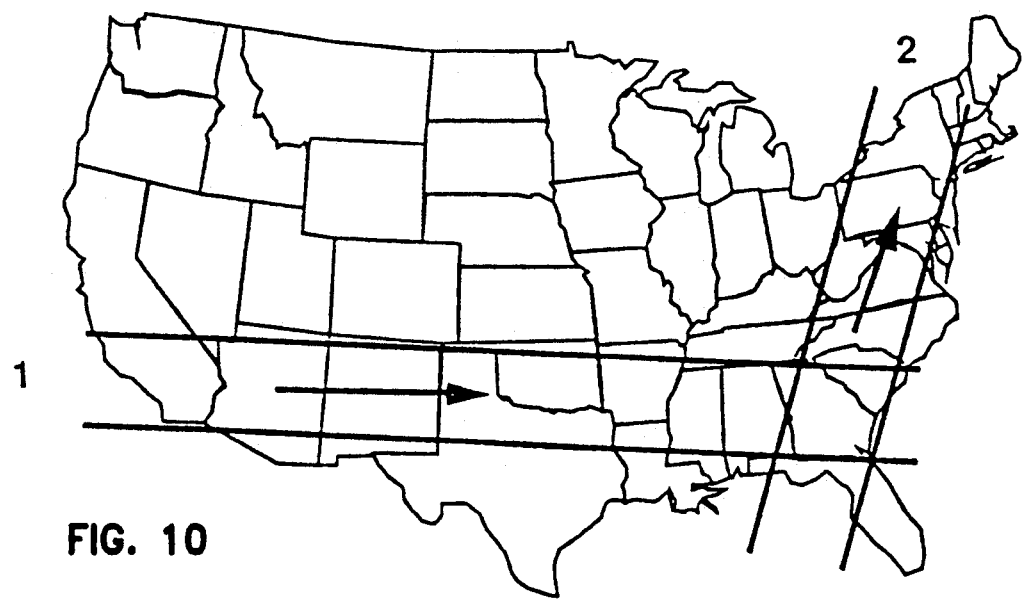
FIG. 9 illustrates the prediction of van movement from area to area.
FIG. 10 illustrates a series of tubes defining a route from Los Angeles to Georgia to New York.
FIG. 12 illustrates the repositioning of van from areas of excess to areas of shortage.

FIG. 9 illustrates a van starting at point A, area 2,1 on 8/1, which needs to pick up 10,000 lbs from B on 8/2 and deliver it on 8/4 at point C. The module 24 would make the following predictions:

8/1 area 2,1
8/1 area 3,2
8/2 area 3,2
8/2 area 3,2
8/3 area 3,3
8/3 area 3,4
8/4 area 3,4
8/4 area 3,4

PREDICTION OF TUBES

Prediction module 34, using the relevant system data, makes a prediction as to the location of a van 14 in a tube 6 over a period of time. The system predicts the movement of vans within tubes twice per day. The prediction is based on the future directions that the van will move. The goal of the tube prediction is to detect when a van will be changing direction so that the users or the system can take advantage of the van's new direction.

FIG. 10 shows a van in a tube 40 going from Southern California to Georgia and then in a second tube 42 from Georgia to New York. The system will predict the tube the van will be in each day. For example, a sample of what the output might be for this van is given below:

8/1 Tube 40 (Los Angeles)
8/1 Tube 40
8/2 Tube 40
8/2 Tube 40
8/3 Tube 40
8/3 Tube 40
8/4 Tube 40
8/4 Tube 40
8/5 Tube 40 (This is just prior to Georgia)
8/5 Tube 42
8/6 Tube 42
8/6 Tube 42
8/7 Tube 42
8/7 Tube 42 (New York)

Note that, had the van been given en route pick ups or deliveries, or had the driver specified a call in point outside of assigned tubes, the predictions for this van would have been updated to reflect the new tube directions. Each time a driver calls in or an order assigned to a van changes in some manner, the predictions for the van are updated to reflect the latest information available.

GEOGRAPHIC OBSTACLES

The system has been designed and implemented in such a way as to avoid predicting that a van will be in an impossible location, such as the great lakes or the Gulf of Mexico. It also takes into account the time delay experienced when a van has to route itself around such an obstacle.

The way the system does this is to create a series of impossible movement sets composed of areas and tubes. These movement sets are retained as data sets in the database. If a van is predicted to be in an area and tube which are marked as impossible, the set of data indicates to the system how to route or predict the routing of the van. For example, if a van is going from Maine to Minnesota, the van will actually go south of the great lakes, across Pennsylvania, Ohio, Indiana, Illinois, and Wisconsin. The system will predict this set of areas, as well as predict the van will follow a tube across these areas instead of a tube which would cross all of the great lakes.

OVERALL APPROACH

Figure 11:
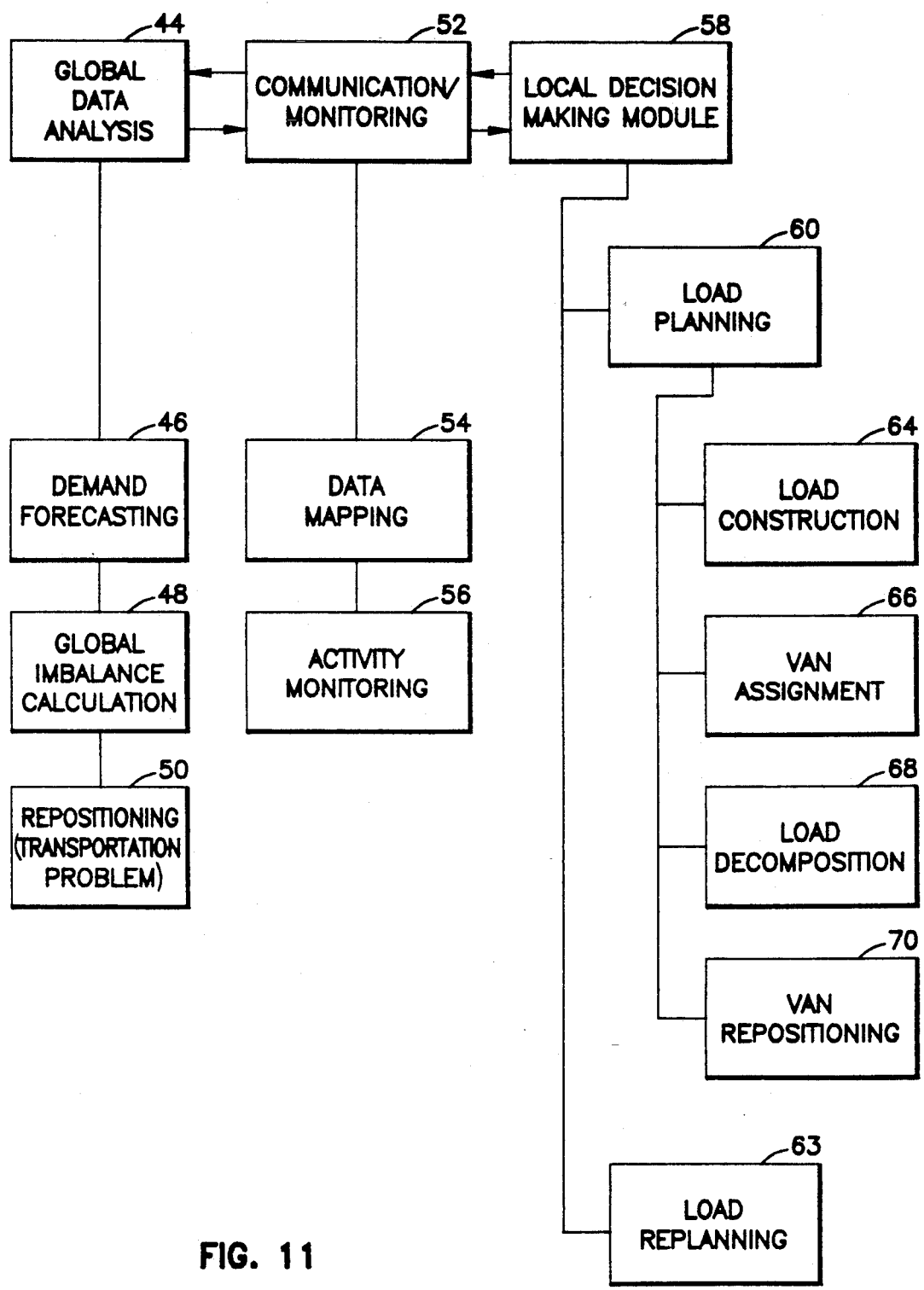
FIG. 11 is a flow chart of the three levels of decision making in the system.

Three levels of decision making were established to accomplish an hierarchy for analyzing the data, as illustrated in FIG. 11. At each of these levels, data is captured and analyzed, decisions are made, and the decisions or results are passed to the next level, either in detail or aggregated form. Each level focuses on a different amount of geographic detail and a different range of time.

GLOBAL DATA ANALYSIS

The Global Data Analysis module 44, illustrated in FIG. 11, focus on decision making from a high level perspective, looking at the problem in terms of all geographic areas over relatively longer periods of time. Currently, the Global Data Analysis module 44 works with a seven-day planning horizon.

The Global Data Analysis module analyzes all available information in order to accomplish three tasks:
Forecast order demand
Determine the expected demand imbalances
Calculate optimal repositioning of capacity (vans) to meet order demand
This three-step process classifies the various areas within the global system. The information is passed to the Communication./Monitoring module 52, and ultimately to the Local Decision Analysis module 58, which make the local van assignment and load construction decisions in real time. This information forms a basis for deciding the appropriate groupings of the orders in real time, and the repositioning of vans.

DEMAND FORECASTING MODULE

In order to determine what the expected imbalance for an area might be, it is necessary to predict the expected inbound and outbound order volume over the planning horizon. Demand forecasting 46 is the first step in the Global Data Analysis.

This problem is not as simple as computing a gross forecast at the national level. Instead, it requires inbound and outbound volumes to be computed for each area in the geographical region. Once these volumes are calculated, the Global Imbalance 48 in each area may be determined and the transportation problem 50 can be solved.

The problem of predicting order demand for some period of time in the future is refined by splitting the order volume into two categories: registered and unregistered. Registered refers to those orders which have already been registered at the beginning of the forecasted period. Unregistered refers to those orders which fall in the forecasted period, but have not yet been registered. The complete demand prediction for any area is the sum of the area's registered order volume and predicted unregistered order volume.

A straightforward way to think of registered and unregistered orders is to think in terms of the seven-day planning periods used in Global Data Analysis. These periods are chronologically contiguous, so any calendar date will map into a unique period. If the registration date and early pick up date map to the same seven-day period, then the order volume is counted as unregistered outbound volume. Remember that unregistered orders are unknown at the time the forecast is made. After the fact mapping of unregistered orders is used to fill the databases from order history information. If the registration date maps to a period earlier than the period associated with the early pick up date, then the volume would be registered outbound tonnage. Registered and unregistered inbound tonnage is accounted for by using this same logic with the registration date and middle delivery date of the order.

Global Data Analysis is chronologically oriented to seven-day periods. Every seven days Global Data Analysis will be executed and a demand forecast will be made for the next seven days. Accordingly, there is a set of registered and unregistered order statistics for each seven-day period.

REGISTERED ORDERS

As new orders are registered, the statistical database of orders is updated. This means that making a prediction for orders which have already been registered is as easy as accumulating statistics from the order statistical database. The database stores order pick up and delivery information, based on early pick up and middle delivery dates.

Like outbound tonnage, registered inbound tonnage tallies are accumulated as the orders are registered, using the middle delivery date as a calendar reference. The middle delivery date is simply that date closest to the middle of the early delivery and late delivery dates. When the inbound demand forecast is made for a seven-day period, the registered inbound totals will also be available for each geographical area based on the destination areas of the registered shipments.

UNREGISTERED ORDERS

The previous step accumulated information about orders which have already been registered and which early pick up (or middle delivery) dates fall in the prediction window. The next step builds on this known data by predicting how many more orders will fall in this prediction window that have not yet been registered. A certain percentage of orders will fall in the order prediction window even though they have not been registered as of today. For example, if today's date is 8/20/89 and the seven-day prediction window begins on 8/21/89, an order might have an early pick up of 8/26/89 and a registration date of 8/23/89.

GLOBAL IMBALANCE CALCULATION MODULE

The Global Imbalance Calculation module 48 is executed after demand forecasting. For a given geographic area A, expected outgoing tonnage is defined as the expected total tonnage of all orders shipped from this area A to the rest of the country over some time horizon, H. Expected incoming tonnage is the total tonnage of all orders shipped from the rest of the country to area A over the same time horizon.

Two statistics are added into the simple in—out imbalance calculation. For outbound tonnage, the objective is to calculate the capacity (number of vans) needed for the seven-day forecast period. The primary contributor to the outbound volume for a given seven-day period will be those orders with early pick up dates in the seven-day period. In addition, there are some orders which were picked up in the previous seven-day period and put in a warehouse. Vans are also needed to service this outbound tonnage. So, the total outbound capacity equals the forecasted order volume added to actual orders picked up and stored in the previous calendar period.

Similarly, for inbound tonnage the system considers order volume which has been forecasted to arrive at its destination during this seven-day period. However, the system is really calculating is the capacity (vans) which is arriving in a given area during this period. This being the case, those empty vans which were already in the area at the beginning of the period in question must also added to the capacity count. In other words, inbound capacity equals inbound order volume plus empty vans already in the area.

If the expected outgoing capacity for A over horizon H is equal to the expected incoming capacity for A over H, then A is balanced. If A is not balanced, then either the expected incoming capacity is greater than the expected outgoing capacity (excess) or outbound is greater than inbound (shortage). This imbalance implies that a certain number of empty vans must move from excess areas to shortage areas. Empty van movement, referred to as "deadheading," cannot be avoided, but can be minimized in order to reduce costs.

Each of the geographical areas in the system has now been identified as being balanced, a shortage area, or an excess area. Some of these areas will be dropped from the global imbalance problem due to the insignificance of their imbalance. Balanced areas are dropped because they do not need any vans and they do not have any excess vans to send to shortage areas. Other areas are screened out by one of two rules.

The first rule compares inbound (outbound) volume for an area to the average inbound (outbound) volume for all areas across the nation. In the present embodiment, if the volume of the area in question is less than 10% of the magnitude of the national average, then the area is subject to being dropped from the problem. Specifically, if both the inbound and outbound volumes of the area are less than 10% of their respective national averages, then the area is dropped from the problem. The area, although it is not balanced, could not have a significant impact on the global imbalance problem.

The second rule tests the significance of the actual imbalance of an area. First, the system computes the minimum of the inbound and outbound volumes of an area. If the imbalance for the area is less than the square root of this minimum, then the area is dropped due to an insignificant imbalance.

Once all the areas have been screened, the system will have a list of significant areas which is a subset of the 77 areas which make up the geographical region of the present embodiment. Only these significant areas will be passed to the Transportation module, which optimize repositioning of capacity. The Transportation module requires that the total inbound volume for all of these significant areas equal the total outbound volume for these areas.

Let S equal supply and D equal demand, for the balanced problem, $$\sum_{i=1}^{m} S_i = \sum_{j=1}^{n} D_j$$

when all data and all significant areas are considered. The problem will not be balanced due to not considering all areas and the fact that most orders are not picked up and delivered in the same week. This means that an order could be counted as a pick up in one time period and as a delivery in the next time period, thus making a balanced system within a single time period virtually impossible. The requirement that the sum of the van demands from deficit areas equals the sum of the van supplies available from excess areas can be satisfied by scaling the demand to be no more than the supply. For instance, if supply exceeds demand, each $D_j$ can be multiplied by the sum of the supply areas divided by the sum of the demand areas. The Transportation module may be executed once this step is completed.

REPOSITIONING (TRANSPORTATION PROBLEM)

The Repositioning module 50 determines what the movement of vans should be in order to minimize mileage and time when repositioning vans. Repositioning is the process of moving vans from an area which is forecasted to have an excess of vans to an area that is predicted to have a shortage.

The resulting movement information, which takes the form of a table illustrated in FIG. 12, is used during Local Decision Analysis for making dispatch decisions for vans.

The table of FIG. 12 indicates the movement of empty capacity (or additional van capacity) from the excess areas to the shortage areas shown. The volume is the estimated amount of van capacity which needs to be moved.

These calculations are based on forecasted order volumes. Actual inbound and outbound order volumes may vary from this prediction. Therefore, if the actual demand in an excess or shortage area varies greatly from the forecast, there is a possibility that an area may not end up with the number of vans needed. This could result from vans being moved to an area that doesn't need them any longer, or vans being repositioned from an area that actually could use them. Local decision making system exist which will detect and react to these situations, if necessary.

SOLVING THE TRANSPORTATION PROBLEM (REPOSITIONING)

Due to demographic trends, vans will accumulate in some areas while other areas will experience a perpetual shortage of capacity. This an other inherent household moving trends may contribute to an accumulation of vans in one area while another area is experiencing a shortage. The point is that some vans will have to be relocated from the excess areas to the shortage areas without a load. This deadheading is a necessary part of the solution to the Load Planning System.

The global imbalance problem that results from not having equal inbound and outbound volumes in each area is a special case of the general linear programming problem known as the transportation problem. While the problem can be formulated and solved as a linear programming problem, its special mathematical structure allows solution by much more efficient algorithms.

To illustrate the solution procedure and the algorithms coded to implement it, consider a case with three excess areas (F) and four deficit areas (W). The cost (C) of relocating a van from an excess area to where it is needed is proportional to the distance between two areas. The objective of the problem is to develop a strategy for relocating the vans that minimizes the total cost. This problem has traditionally been laid out in a matrix format.

The matrix is shown below.

| Excess Nodes (Areas) | Deficit Nodes (Areas) | | | | F's Capacity |
|---|---|---|---|---|---|
| | $W_1$ | $W_2$ | $W_3$ | $W_4$ | |
| F1 | | $C_{ij}$ | | | 100 |
| F2 | | | | | 250 |
| F3 | | | | 150 | |
| W's Requirements | 100 | 150 | 200 | 50 | 500 |

This problem can be formulated as a linear programming problem, where the objective is to minimize the total cost of relocating the vas subject to the excess capacity and requirement constraints at the excess and deficit areas as follows:

Let $x_{ij}$ = number of vans shipped from $F_i$ to $W_j$
and $c_{ij}$ = cost of transporting an empty van from $F_i$ to $W_j$.

The cost of transporting empty vans is proportional to $d_{ij}$, the great circle distance between $F_i$ and $W_j$ times a 1.2 travel factor.

The problem is to optimize the objective function.

$$z = \sum_{i=1}^{m} \sum_{j=1}^{n} c_{ij} x_{ij} \quad \text{for } i = 1, 2, \ldots m$$
$$j = 1, 2, \ldots n$$

subject to the constraints that $$\sum_{i=1}^{m} x_{ij} = D_j, \text{ for } j = 1, 2, \ldots n$$

$$\sum_{j=1}^{n} x_{ij} = S_i, \text{ for } i = 1, 2, \ldots, m$$

$$x_{ij} \geq 0, \text{ for all } i, j$$

$D_j$ and $S_i$ are non-negative integers that represent, respectively, the demand at the $j^{th}$ deficit area and the excess capacity available at the $i^{th}$ source or excess area. For the balanced problem, $$\sum_{i=1}^{m} S_i = \sum_{j=1}^{n} D_j$$

when all data and all areas are considered. The requirement that the sum of the van demands from deficit areas equals the sum of the van supplies available from excess areas can be satisfied by scaling the demand to be no more than the supply. This task is accomplished in the Imbalance module.

THE INITIAL SOLUTION

The first step in solving the transportation problem is to develop an initial basic feasible solution. The method chosen to accomplish this is the Penalty Method, which involves determining the penalty for not assigning a resource to a requirement. The penalties for each resource (row) are determined by subtracting the smallest $c_{ij}$ value in the row from the next smallest. Similarly, the penalty values for each requirement (column) are determined by subtracting the smallest $c_{ij}$ value in each column from the next smallest. The objective is to make the initial allocation such that the penalties from not using the cells are minimized. This can be done by allocating the resources to the requirements so as to avoid large penalties.

The rules for determining the initial allocation are:
1. Subtract the smallest $c_{ij}$ value in each row from the next smallest. Place this number at the end of the row.
2. Subtract the smallest $c_{ij}$ value in each column from the next smallest. Place this number of the foot of the column.
3. Determine the largest penalty for either row or column. Allocate as many units as possible to the cell with the largest penalty cost so as to avoid this penalty. If a row resource is exhausted and a column requirement satisfied by a single allocation, place a zero in a neighboring cell.
4. Recalculate the penalty cost, ignoring only rows whose resources are exhausted or columns whose requirements are satisfied.
5. Repeat steps 3 and 4 until allocations have been made.

The matrix below shows the costs ($c_{ij}$) of allocating one unit from Fi to Wj. The penalties have also been determined (Steps 1 and 2 above), and are included in an additional row and column of the matrix.

| | $W_1$ | $W_2$ | $W_3$ | $W_4$ | Capacity | Penalty |
|---|---|---|---|---|---|---|
| $F_1$ | 300 | 250 | 400 | 200 | 100 | 50 |
| $F_2$ | 290 | 260 | 350 | 400 | 250 | 30 |
| $F_3$ | 310 | 330 | 370 | 300 | 150 | 10 |
| Requirements | 100 | 150 | 200 | 50 | 500 | |
| Penalty | 10 | 10 | 20 | 100 | | |

The largest penalty is associated with the W4 column. Of the resources available to meet W4's need, 1 has the lowest cost of allocating resources. Therefore, units from F1 should be allocated to W4 in order to avoid this penalty. If this allocation is not made, an additional cost of at least 100 per unit will be incurred in transporting units to W4.

Next, the largest penalty is 50 associated with $F_i$. This penalty can be avoided by allocating $F_i$ capacity to $W_2$, the allocation resulting in the minimum cost. Although W4 cost is lower than W2, W4 is no longer being considered since W4 requirements were satisfied above. Furthermore the transportation cost from $F_1$ to W4 cannot be used in determining the penalty for $F_1$. The allocation of $F_1$ capacity to $W_2$ is shown on the next page, as well as the recalculated penalties.

|       | $W_1$ | $W_2$ | $W_3$ | $W_4$ | Capacity | Penalty |
|-------|-------|-------|-------|-------|----------|---------|
| $F_1$ | 300   | 250   | 400   | 200   | 100      | —       |
|       |       | 50    |       | 50    |          |         |
| $F_2$ | 290   | 260   | 350   | 400   | 250      | 30      |
| $F_3$ | 310   | 330   | 370   | 300   | 150      | 20      |
| Requirements | 100 | 150 | 200 | 50 | 500 |    |
| Penalty | 20  | 70    | 20    | —     |          |         |

The next largest penalty is 70, associated with $W_2$. This penalty is avoided by allocating 100 units of $F_2$ capacity to $W_2$.

The penalties are again recalculated, considering only those remaining rows and columns with unfilled requirements or unused capacity. The penalties still left are those associated with $F_2$ and $F_3$ to $W_3$.

The matrix below shows the final allocations in the initial solution.

|       | $W_1$ | $W_2$ | $W_3$ | $W_4$ | Capacity | Penalty |
|-------|-------|-------|-------|-------|----------|---------|
| $F_1$ | 300   | 250   | 400   | 200   | 100      | —       |
|       |       | 50    |       | 50    | 50       |         |
| $F_2$ | 290   | 260   | 350   | 400   | 250      | —       |
|       | 100   | 100   | 50    |       |          |         |
| $F_3$ | 310   | 330   | 370   | 300   | 150      | —       |
|       |       |       | 150   |       |          |         |
| Requirements | 100 | 150 | 200 | 50 | 500 | — |
| Penalty | —   | —     | —     | —     |          |         |

AN ALGORITHM TO SOLVE THE GLOBAL IMBALANCE PROBLEM

After an initial solution to the transportation problem is obtained, alternative solutions must be elevated. A straightforward method of calculating the effect of alternative allocations is provided by the following simple algorithm.

To apply the algorithm it must be verified that the initial solution is a basic solution. In the linear programming problem, a basic solution is found for a problem of x variables and y constraints by equating x-y variables to zero and solving the resulting systems of y equations and y variables simultaneously.

The transportation problem is constructed so that there are $m+n$ equations, where n represents the number of requirements and m represents the number of resources. It can be shown that one of these $m+n$ equations is redundant and that there are only $m+n-1$ independent equations. For a solution to be basic, therefore, $m+n-1$ cells must be occupied. This means that $m+n-1$ cells in the initial solution must contain either an allocation or a zero.

If the initial solution contains less than $m+n-1$ occupied cells, the solution is termed degenerate. Degeneracy occurs only when the resources of a row are exhausted and the requirements of a column are satisfied by a single allocation. It is eliminated by placing a zero in a cell that borders the allocation. The zero-valued cell is then considered occupied when applying the algorithm.

The algorithm involves transferring one unit from an occupied to an unoccupied cell and calculating the change in the objective function. The transfer must be made so as to retain the column and row equalities of the problem. After all unoccupied cells have been evaluated, a reallocation is made to the cell that provides the greatest per unit change in the objective function. Any degeneracy caused by the transfer of units must be removed by placement of zeros in the appropriate cells.

The process of evaluating the empty cells and reallocating the units is continued until no further improvement in the objective function is possible. This final allocation is the optimal solution.

To illustrate the procedure, consider the transportation problem with the following initial solution:

|       | $W_1$ | $W_2$ | $W_3$ | $W_4$ | Capacity |
|-------|-------|-------|-------|-------|----------|
| $F_1$ | 300   | 250   | 400   | 200   | 100      |
|       | 100   | 0     |       |       |          |
| $F_2$ | 290   | 260   | 350   | 400   | 250      |
|       |       | 150   | 100   |       |          |
| $F_3$ | 310   | 330   | 370   | 300   | 150      |
|       |       |       | 100   | 50    |          |
| Requirements | 100 | 150 | 200 | 50 | 500 |

To determine the effect on the objective function of transferring one unit to an unoccupied cell, a closed path between the unoccupied cell and occupied cells must first be found. The path consists of a series of steps leading from the unoccupied cell to the occupied cells and back to the unoccupied cell.

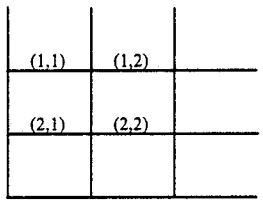

In the case of cell (2,1) for instance, a closed path consists of the series of steps from this cell to cell (1,1), from cell (2,2) back to cell (2,1). This is illustrated in the diagram above.

By following this path, the effect on the objective function of allocating a unit to cell (2,1) can be determined. To illustrate, assume that one unit is allocated to cell (2,1). In order to maintain the column and row equalities in the problem, a unit must be subtracted from cell (1,1), added to cell (1,2) and subtracted from cell (2,2). Notice that this reallocation of units follows the closed path for cell (2,1).

The net change in the objective function from the reallocation of on unit to cell (2,1) can be found by adding or subtracting the appropriate transportation costs of each cell in the closed path. Adding one unit to cell (2,1) increases the objective function by 290, subtracting the unit from cell (1,1) reduces the objective function by 300, adding the unit to cell (1,2) increases the objective function by 250, and subtracting the unit from cell (2,2) reduces the objective function by 260. The net decrease n the objective function is, therefore 20. This decrease can be represented in equation form by $$F_2W_1 = +F_2W_1 - F_1W_1 + F_1W_2 - F_2W_2$$

or $$F_2W_1 = +290 - 300 + 250 - 260 = -20$$

The net decrease of 20 is entered in the lower right corner of cell (2,1) in the following table.

|       | $W_1$ | $W_2$ | $W_3$ | $W_4$ | Capacity |
|-------|-------|-------|-------|-------|----------|
| $F_1$ | 300   | 250   | 400   | 200   | 100      |
|       | 100   | 0     |       |       |          |
| $F_2$ | 290   | 260   | 350   | 400   | 250      |
|       | −20   | 150   | 100   |       |          |
| $F_3$ | 310   | 330   | 370   | 300   | 150      |
|       |       |       | 100   | 50    |          |
| Requirements | 100 | 150 | 200 | 50 | 500 |

The effect of reallocating one unit to each of the other unoccupied cells is determined in the same manner. The computations are shown on the next page. It is important to remember that the closed path is established so as to maintain both column and row equalities.

$$F_3W_2 = +F_3W_2 - F_2W_3 + F_2W_3 - F_2W_2 = +50$$

$$F_1W_3 = +F_1W_3 - F_2W_3 + F_2W_2 - F_1W_2 = +60$$

$$F_2W_4 = +F_2W_4 - F_3W_4 + F_3W_3 - F_2W_3 = +120$$

$$F_3W_1 = +F_3W_1 - F_3W_3 + F_2W_3 - F_2W_2 + F_1W_2 = -20$$

$$F_1W_4 = +F_1W_4 - F_3W_4 + F_3W_3 - F_2W_2 - F_1W_2 = -70$$

The net change in the objective function saved by reallocating one unit to each unoccupied cell is shown in the matrix below:

|       | $W_1$ | $W_2$ | $W_3$ | $W_4$ | Capacity |
|-------|-------|-------|-------|-------|----------|
| $F_1$ | 300   | 250   | 400   | 200   | 100      |
|       | 100   | 0     | +60   | −70   |          |
| $F_2$ | 290   | 260   | 350   | 400   | 250      |
|       | −20   | 150   | 100   | +120  |          |
| $F_3$ | 310   | 330   | 370   | 300   | 150      |
|       | −20   | +50   | 100   | 50    |          |
| Requirements | 100 | 150 | 200 | 50 | 500 |

A reallocation is made to the most favorable evaluation, which is the cell that provides the largest per unit decrease in the objective function. The reallocation follows the closed path used to calculate the change in the objective function. As many units as possible are reallocated to the cell.

Referring to the table above, note that the largest per unit decrease in the objective function comes from reallocating units to cell (1,4). The closed path used to evaluate cell (1,4) was:

$$F_1W_4 = +F_1W_4 - F_3W_4 + F_3W_3 - F_2W_3 + F_2W_2 - F_1W_2.$$

The limit on the number of units that can be reallocated to cell (1,4) is equal to the minimum of the current allocations to cells (3,4), (2,3), and (1,2). The table shows that 50 units can be subtracted from cell (3,4), 100 units can be subtracted from cell (2,3) and 0 units can be subtracted from cell (1,2). Unfortunately, the closed path used to evaluate cell (1,4) involved subtracting units from cell (1,2) to cell (1,4). This would not decrease the value of the objective function.

Rather than merely transferring the 0 entry from cell (1,2) to cell (1,4), units can be reallocated to a cell that decreases the value of the objective function by 20 per unit. Cell (2,1) is arbitrarily selected for reallocation. The closed path used to evaluate cell (2,1) was $F_2W_1 = +F_2W_1 - F_1W_1 + F_1W_2 - F_2W_2$. The limit on the assigned number of units that can be added to cell (2,1) is the 100 units initially assigned to cell (1,1). This is due to the fact that units must be subtracted from cell (1,1) and cell (1,1) contains only 100 units. These units are reallocated to cell (2,1). In order to maintain the column and row equalities, 100 of the 150 units in cell (2,2) are reallocated to cell (1,2). This leaves 50 units in cell (2,2).

The new transportation table is shown below.

|       | $W_1$ | $W_2$ | $W_3$ | $W_4$ | Capacity |
|-------|-------|-------|-------|-------|----------|
| $F_1$ | 300   | 250   | 400   | 200   | 100      |
|       | +20   | 100   | +60   | −70   |          |
| $F_2$ | 290   | 260   | 350   | 400   | 250      |
|       | 100   | 50    | 100   | +120  |          |
| $F_3$ | 310   | 330   | 370   | 300   | 150      |
|       | ±0    | +50   | 100   | 50    |          |
| Requirements | 100 | 150 | 200 | 50 | 500 |

The solution shown contains six occupied cells. Since there are 3 rows and 4 columns in the problem and the number of occupied cells is equal to m+n−1, the solution is not degenerate. Therefore, none of the blank cells need to be as occupying a zero level.

The algorithm is used to evaluate the unoccupied cells in the table. The calculations are shown below:

$$F_1W_1 = +F_1W_1 - F_1W_2 + F_2W_2 - F_2W_1 = +20$$

$$F_3W_1 = +F_3W_1 - F_3W_3 + F_2W_3 - F_2W_1 = \pm 0$$

$$F_3W_2 = +F_3W_2 - F_3W_3 + F_2W_3 - F_2W_2 = \pm 50$$

$$F_1W_3 = +F_1W_3 - F_2W_3 + F_2W_2 - F_1W_2 = +60$$

$$F_1W_4 = +F_1W_4 - F_3W_4 + F_3W_3 - F_2W_3 + F_2W_2 - F_1W_2 = -70$$

$$F_2W_4 = +F_2W_4 - F_3W_4 + F_3W_3 - F_2W_3 = +120$$

The table shows that units should be reallocated to cell (1,4). The reallocation is made by following the closed path that gave the 70 per unit decrease in the objective function for the cell. The reallocation would produce the following table:

|       | $W_1$ | $W_2$ | $W_3$ | $W_4$ | Capacity |
|-------|-------|-------|-------|-------|----------|
| $F_1$ | 300   | 250   | 400   | 200   | 100      |
|       |       | 50    |       | 50    |          |
| $F_2$ | 290   | 260   | 350   | 400   | 250      |
|       | 100   | 100   | 50    |       |          |
| $F_3$ | 310   | 330   | 370   | 300   | 150      |
|       |       |       | 150   |       |          |
| Requirements | 100 | 150 | 200 | 50 | 500 |

The same process is again applied to evaluate the unoccupied cells in the table. The calculations are shown below:

$F_1W_1 = +F_1W_1 - F_2W_1 + F_2W_2 - F_1W_2 = +20$ $F_3W_1 = +F_3W_1 - F_3W_3 + F_2W_3 - F_2W_1 = \pm 0$ $F_3W_2 = +F_3W_2 - F_3W_3 + F_2W_3 - F_2W_2 = \pm 50$ $F_1W_3 = +F_1W_3 - F_2W_3 + F_2W_2 - F_1W_2 = +60$ $F_1W_4 = +F_2W_4 - F_2W_2 + F_1W_2 - F_1W_4 = +190$ $F_3W_4 = +F_3W_4 - F_3W_3 + F_2W_3 - F_2W_2 + F_1W + 120$

Since all of the above evaluations are non-negative, the solution is optimal. This is not, however, a unique solution. The value of the objective function, which can be obtained by multiplying the cost (mileage between F and W) by the number of units in each cell, is 150,500.

An easier method for evaluating the unoccupied cells in a transportation tableau is described in what follows. This method, which provides a shortcut for evaluation the unoccupied cells, has been implemented.

To illustrate the implemented algorithm, consider the initial solution to the problem, as shown on the next page. In addition to the initial solution, the table includes a column labeled $u_i$ and a row labeled $v_j$.

|    | W1  | W2  | W3  | W4  | Capacity | ui |
|----|-----|-----|-----|-----|----------|-----|
| F1 | 300 100 | 250 | 400 | 200 | 100 | u1 |
| F2 | 290 | 260 150 | 350 100 | 400 | 250 | u2 |
| F3 | 310 | 330 | 370 100 | 300 50 | 150 | u3 |
| Requirements | 100 | 150 | 200 | 50 | 500 | |
| vj | v1 | v2 | v3 | v4 | | |

The numerical values of $u_i$ and $v_j$ can be calculated from the equation $$D_{ij} = c_{ij} - u_i - v_j$$

where $D_{ij}$ represents the net change in the objective function of the transportation problem from reallocating one unit to cell (i,j) and $c_{ij}$ represents the transportation costs from $F_i$ to $W_j$.

The modified algorithm consists of determining the values of $u_i$ for the i=1,2, ... m rows and the values of $v_j$ for the j=1,2, ... n columns of the transportation table. After the values of $u_i$ and $v_j$ have been determined, the change in the objective function caused by reallocating units can be determined by calculating the value of $d_{ij}$ for each unoccupied cell. The values of $D_{ij}$ are entered in the unoccupied cells, then units are reallocated to the cell with the most favorable $D_{ij}$. The $D_{ij}$ values for all occupied cells are zero. In order to solve for $u_i$ and $v_j$ $D_{ij}$ must be made to equal zero for each occupied cell and solve resulting system of equations simultaneously.

The system has six equations and seven variables:

$u_1 + v_1 = 300$ $u_1 + v_2 = 250$ $u_2 + v_2 = 260$ $u_2 + v_3 = 350$ $u_3 + v_3 = 370$ $u_3 + v_4 = 300.$

In order to obtain a solution, one of the variables must be set to zero. In the modified algorithm implemented, $u_i$ is always specified as equalling zero.

In this example, equating $u_1$ to zero and solving the system of equations gives the following solution.

$u_1 = 0 \quad v_1 = 300$ $u_2 = 10 \quad v_2 = 250$ $u_3 = 30 \quad v_3 = 340$ $\quad\quad\quad\quad v_4 = 270$ After the reallocation, the algorithm is reapplied to subsequent tableau. This method of determining the values of $u_i$ and $v_j$ is derived from the linear programming formulation of the transportation problem.

The solution is obtained by reapplying the procedure until no improvement in the objective function is possible. The solution can be read as a list of movements of van capacity from an excess area to a shortage area. In the example, this would be:

50 units from F1 to W2
50 units from F1 to W4
100 units from F2 to W1
100 units from F2 to W2
50 units from F2 to W3
150 units from F3 to W3

The final optimal matrix is shown below:

|    | W1  | W2  | W3  | W4  | Capacity | ui |
|----|-----|-----|-----|-----|----------|-----|
| F1 | 300 | 250 50 | 400 50 | 200 | 100 | 0 |
| F2 | 290 100 | 260 100 | 350 50 | 400 10 | 250 | 10 |
| F3 | 310 | 330 | 370 150 | 300 | 150 | 30 |
| Requirements | 100 | 150 | 200 | 50 | 500 | |

| | W1 | W2 | W3 | W4 | Capacity | ui |
|---|---|---|---|---|---|---|
| vj | 300 | 250 | 340 | 270 | | |

COMMUNICATION/MONITORING MODULE

The Communications and Monitoring module 52 focuses on facilitating the movement of information from global data analysis to the local decision analysis. Using the Data Mapping module 54 and Activity Monitoring module 56, actual results are monitored and compared to expected values, and exceptional conditions are reported.

The communication and monitoring function is dispersed throughout the implementation of the system. Therefore, gathering statistics, comparing results, and reporting on exceptions does not all occur in one place.

LOCAL DECISION ANALYSIS MODULE

Local Decision Analysis module 58 is responsible for planning the consolidation of orders into loads, the assignment of these consolidated orders to vans, load decomposition, and the repositioning of the vans based on the constraints imposed by time frames and minimizing costs.

There are different load planning strategies for the peak and off-peak seasons. The beginning and end of the seasons are defined by user specified parameter values in the Global system. Replanning is the same for peak and off-peak seasons.

The load consolidation, van assignment and routing decisions interact and impact each other. Assigning a new order to a van may impact the delivery time of the orders that have already been picked up by the van. New orders and changes to existing orders are constantly being recorded. Van location, status and capacity information is frequently changing as well. The task of the local decision analysis is to optimize this grouping of orders while carrying out the strategies set up by the global system.

The Local Decision Analysis module 58, illustrated in FIG. 11, can be broken down into Load Planning 60 and Replanning 62. Load Planning builds a three-day load plan. A three-day load planning horizon was chosen in order to support the use of the pick-up and store policies, while still making decisions at the last possible moment, when the most information is available. As order and van changes occur over those three days, the Local System must react dynamically and replan using the latest van and order information.

LOAD PLANNING

Load Planning module 60 is divided into four processes, as illustrated in FIG. 11; 1) Load Construction 64, 2) Van Assignment 66, 3) Load Decomposition 68, and 4) Van Repositioning 70. Each of these processes will be described in the following four sections.

LOAD CONSTRUCTION MODULE

The Load Construction module 64 process the relevant data in the system database to build loads from available orders. In order to build these loads, all orders inside a tube are found and grouped together into order pools at the beginning of each day. All unassigned orders in a tube whose pick up window falls within the window of construction (the number of days looked at in forming a pool of orders) are formed into a pool, specified in the database. It is from these pools that orders are chosen to be grouped together into loads. Pick up and delivery window time data, as well as other order data referred to herein, is entered by system operators through the system terminals. Full details of the information entered for an order record is found in the Appendixes hereto.

THE LOAD CONSTRUCTION PROCESS

Once orders have been grouped into order pools, loads can be formed by selecting compatible orders within a given pool. When the number of orders in a pool is sufficiently small, the neighboring tubes' pools are added to make one large pool. Load construction is accomplished through the iterative process of forming the best loads possible within a given set of constraints. The constraints are then adjusted for the next best possible load and the load-forming process is repeated using the remaining available orders in the pool and the new load construction constraints.

The constraints which govern the load making process can be separated into three levels: capacity constraints, priority constraints, and distance considerations. The highest level is the minimum load capacity, a parameter used by the system to exclude small, infeasible combinations of orders from being treated as a load. The total capacity of a proposed combination of orders must meet a minimum capacity in order to qualify as a load. The best loads are the ones that have the highest possible capacity. Therefore, the first iteration of the load construction process sets a high load capacity minimum. An attempt is made to form loads that will be at least as full as this ideal load minimum. As many of these best loads are formed, within the other given constraints, until it is no longer possible to form any more loads at the given capacity level. Once this has happened, the minimum load size is decreased by a fixed amount, and the load construction process is begun again, which attempts to form loads at the next best possible load capacity level, from the remaining orders in the pool. When loads can no longer be formed at this new minimum level, the minimum is adjusted again by the step amount and the process is repeated. This iteration is performed until all orders have been grouped into loads, or the lowest acceptable minimum load capacity has been reached. In theory, this minimum should be low enough to allow all tonnage to be serviced while maximizing the utilization of the vans.

Within each given minimum capacity level, construction of loads is further constrained by the priority of the orders. For each order priority, from highest to lowest, loads will only be formed from orders with the same or higher priority as the priority level.

Assume the highest priority of an order is given a value of 10. The first time through the load construction has been completed for all highest priority orders, the process is begun again (still within the constraint of the same minimum capacity level), but this time orders with a priority of 9 or higher are considered. The next iteration would consider orders with priority of 8 and above, and so on until the last iteration, orders of any priority are considered for inclusion in a load.

Within each given order priority constraint, there is still one further level of selection. Orders that have a distance of 1500 miles or more from their origin to their destination are given first priority. Next, orders with travel distance between 1,000 and 1,500 miles are considered. Finally, all other orders are considered. Therefore, the load construction process is performed once for long distance orders, then the process is performed for intermediate distance orders, then it is repeated for orders regardless for distance.

Once the load construction process has been narrowed down according to the constraints outlined above, orders must be grouped together to make up the individual loads. The proposed combination of orders that make up a load must be checked against an additional set of criteria to make sure that all orders within a load are compatible with each other.

The factors which determine whether orders would be suitable for grouping together into a load are as follows:

- All orders within a load should be traveling in the same general direction.
- The additional travel distance of the order being considered for the load should not require the van to travel too far out of the way of the current route.
- The addition of an order to a load should not require a van to backtrack too far when picking up or delivering the order.
- It must be possible to pick up and deliver a load within the time frame defined by the pick up and delivery window of each of its orders.
- Volume and weight of the orders must meet the minimum load capacity requirements, but at the same time, the proposed load cannot exceed the capacity of the van.

The first consideration concerns the location of the pick ups and deliveries and the direction of travel. Move sequences (and corresponding records in the data base) are establish for each load, to provide the carrier with the most efficient route of travel. Sources and destinations of orders that are to be grouped together should be located such that the pick ups are clustered closely together at one end of the route, and deliveries are clustered at the other end. Move sequences must take into consideration whether all orders are travelling in the same direction, whether the total distance travelled by the carrier is minimized, whether backtracking by the van is minimized, and whether the pick up and delivery dates for individual orders will be met.

Thus, the system provides that each move sequence specifies the order in which orders are to be picked up and delivered, and corresponding locations. Dates of each pick up and delivery, as well as additional information regarding the contents of each order is preferably included in the move sequence report. (e.g, special handling instructions). The move sequence instructions for each carrier can be printed or displayed at terminals and can be in a report. The load construction module can also report the orders that have been grouped together without specifying a move sequence.

All the orders in a load must be traveling in the same direction and travel should be as linear as possible. If an order would require the van to travel too far from the route established by the orders already in the load, or if the order would cause the van to backtrack too far, the order should not be included in the load being built.

In addition to meeting these physical constraints, consideration must also be given to the time frame established by the load's pick up and delivery windows. It is a directive of the Load Planning System to satisfy all pick up and delivery windows whenever possible. The pick up window for a load is defined as the intersection of the pick up windows of the individual orders in the load.

For example, consider the following three orders:

| Order | Pick up Window | Delivery Window |
|-------|----------------|-----------------|
| A     | June 10-12     | June 17-19      |
| B     | June 11-14     | June 18-21      |
| C     | June 9-12      | June 16-19      |

The pick up window defined by these three orders would be June 11-12. The delivery window for a load is similarly defined. For the above example, the delivery window for a load composed of orders A, B, and C would be June 18-19, which is the intersection of the delivery windows for each order. All orders in the load must be able to be picked up and delivered within their respective time windows, taking into account not only the time necessary for travel from one point to the next, but also for loading, unloading, and waiting for early pick up and delivery dates. If the composite window defined by the intersection of the individual windows is not long enough, then this composite window is extended to accommodate travel and loading/unloading time.

A final consideration deals with the limitations imposed by the capacity of the vans themselves. The combined volume of the orders in the load cannot exceed the cubic foot capacity of the van.

Each order is checked to see if it meets all of the above constraints before it can be added to a load.

Because of the numerous constraints imposed when constructing a load, there may still be orders left within some of the pools after the construction process has been completed. To try to assign these orders to loads, the construction process is repeated for the remaining orders, but this time the pools from which the loads are built are expanded. To increase the size of the pools, a single tube's pool is combined with the other pools for each of its neighboring tubes. There are four neighboring tubes, consisting of the tubes above and below the primary tube at the same angle and at a $+/-10$ degree angle. These four tubes are the tubes closest to the direction of the primary tube and using them will therefore help minimize mileage for vans. The load consolidation process is then repeated using the increased order pools, and the remaining orders are once again grouped into as many goods and best loads as possible. Orders that still cannot be consolidated are left for the consolidation process on the next day. The output of the load consolidation process is a load data specifying the constructed loads. Load construction module 64 also permits a user to manually override and alter the system generated move sequences, via the terminals. Also, the module permits move sequences to be user created on a manual basis.

VAN ASSIGNMENT MODULE

Van Assignment module 66 matches constructed loads with vans so that orders are delivered in a timely fashion while maximizing van utilization. Constructed loads and loose orders fitting into the window of construction are sorted by early pick up date and area. The result is a set of loads and loose orders for each area over the window of construction. Let d be defined as the set of loads and loose orders whose early pick up date is Day d in some area A. Then, d+1 contains loads and orders in area A whose early pick up date is d+1, and so on.

VAN ASSIGNMENT RULES

Loads and orders are assigned to vans for some Day d in area A according to the following procedures:
1. All empty vans in area A, both Category 1 vans 16 and Category 2 vans 18 are assigned to orders from bucket d.
2. All vans due to arrive in area A and that are predicted to be empty on Day d, whether Category 1 or Category 2 vans are assigned loads or orders from bucket d.
3. Vans passing through area A on day d are given any loads or loose orders from bucket d that are compatible with the van's current cargo and planned pick ups and deliveries.
4. If there are any empty Category 2 vans remaining in area A at this point, an attempt is made to assign each of them a load by searching neighboring areas for unassigned loads. As any such loads are found, they are assigned to the Category 2 vans. Vans for which a load cannot be found are left empty and remain in area A.

Within each of the procedures listed above, van priority is based on a first in/first out protocol. Van assignment module 66 generates van assignments that specify van assignments and can display or print instructions for the van assignment.

LOAD DECOMPOSITION MODULE

The Load Construction module 64 groups orders into loads based on given constraints. The next step is to assign these loads to specific vans that will pick up and deliver the various orders. However, it is not always possible to successfully assign all of the loads to vans within the required time frame. This time frame is defined by the last date of the load's pick up window. Once this date has passed, the orders in these unassigned loads need to be reassessed. To do this, the Load Decomposition module 68 breaks up the previously constructed loads and make the orders available for construction of new loads.

In load decomposition, the system determines which loads have not been assigned to a van in time to meet the customer order date. Any loads that are not assigned to a van by this date are broken into individual orders. These orders are then searched to find those whose final pick up date has been reached, indicating they must be designated as pick-up store order. Once the pick-up and store has been identified these orders will be picked up and warehoused. They will reenter the order pool with a pick up window ranging from the date of warehousing to the order's critical date. The critical date is the last day on which pick-up and store order can be picked up and by traveling a direct route can still be delivered within its delivery spread. The orders from the decomposed loads which do not meet the pick-up and store criteria are returned to the pool of orders available as input into the load construction module once again.

To illustrate, assume the following three orders had been grouped into a load:

| Order | Pick up Window |
|-------|----------------|
| A | June 10–13 |
| B | June 11–14 |
| C | June 9–12 |

The load pick up window is June 11–12. If today is June 12 and the load has not yet been assigned to a van, then the grouping of orders would be dissolved back into individual orders. Each order would then be looked at to determine if it has reached its final pick up date yet. In this case, only one of the orders in the load, order C, has missed its late pick up date and would have to be tagged as a pick-up and store.

Orders A and B would be returned to the pool of available orders to be considered for en route consolidation, or the load construction process at the beginning of the next day.

VAN REPOSITIONING MODULE

The Van Repositioning module 70 is designed to make sure that there are vans available in areas that have orders to be serviced. This module anticipates areas of van excesses and shortages, and tries to route available vans in such a way as to accommodate these needs. However, sometimes empty vans need to be sent form areas of excess to areas of shortage to provide an overall balance of vans and orders across the geographic region. The module produces van repositioning instructions which can be displayed or printed.

The first step in this process is to identify which areas are excess areas (areas that have more vans than are necessary to service the loads in that area), and where those vans should be sent. This step was completed in the Global Data Analysis module by determining the global imbalance 48 and solving the transportation problem 50 for the period of interest. For each of the excess areas, an entry was made in the repositioning table giving the number of vans to be sent to each shortage area.

The next step is to determine how many vans should be repositioned today. The vans are to be sent to their respective areas evenly over the next five days. The strategy employed is to spread the departure of these vans out over the five day period. Once this has been determined, loads are reserved in the shortage area for each of the vans traveling there from the excess area. The process of preassigning loads ensures that a van traveling from an excess area to shortage area will have a load available when it reaches the shortage area.

Suppose that today is day d. If the travel time from area A to area B is one day, then a load is reserved at B out of the loads made for day d+1. If the travel time from area A to area B is two days, then a load is reserved at B from the loads constructed for day d+2. This strategy is sufficient because vans are only sent from areas separated by at most two days of travel. Thus, assignment of loads only needs to be done for the two following days.

OFF-PEAK SEASON PLANNING

Due to the large difference in order volume between peak season and off-peak season, peak season load planning strategies cannot be applied to off-peak season. The significantly lower order volume during the off-peak season requires special strategies to distribute orders among all available vans. In addition, during off-peak season there is a much stronger movement of order volume to the south and west.

The Load Planning System will know which season it is operating in by user specified parameter values in one of the program libraries. The parameters define the calendar begin and end dates of the seasons. This will determine which strategies are applied at any given time of year.

REPLANNING

Orders 10 which are registered at the last minute, vans which appear at the last minute, or vans which call in with space available will cause dynamic planning to take place. The Load Planning system develops a load plan for a three-day horizon based on all available van and order information. Three-day predictions of van locations are maintained as well. When a new order or van appears, then the system must react dynamically. The following is a description of how this dynamic en route consolidation is implemented.

The Load Replanning module 62 operates for orders with a lead time of less than three days. Consider a load plan developed on the 6th for the 7th, 8th, and 9th of the months. An order which has a pick up on the 9th and was not registered until the 7th will cause the load plan to be updated dynamically. The system locates a suitable van. A square search space which is 300 by 300 miles is defined with the order pick up point as its center. Within this space the Local System will search for suitable vans with available space. Note that the search space has the same dimensions as the areas in the geographical region but the search space may partially overlap up to four of these areas in the system.

A similar dynamic planning approach is applied whenever there is a change in the fleet capacity. This includes every time a driver calls in with space available, each time a van appears, and every time an agent makes a van available. The van location is given as the reference point and a rectangular search space appropriate to the fleet is calculated. The length of the rectangle is determined by the distance the van can travel without violating Governmental mileage restrictions. The breadth is determined by the intersection of the appropriate tubes.

In addition to the dynamic planning described above, replanning is required for a number of other reasons. Consider when the original plan could not be executed either due to changes on existing orders or changes in van conditions or user overrides of the system suggestions.

Some of the situations requiring replanning are:
Order is cancelled
Order is changed
Order is forced on a van
Order is removed from a van
Van is out of service
Van is delay or ahead of schedule
User overrides repositioning suggestion

ORDER IS FORCED ON A VAN

If an order is being forced onto a van, the first step is to check if the van is empty. If the van is empty, the order is assigned to the van and a move sequence is generated for the van.

If the van is already hauling at least one order, then check to see if the van can service the forced order. If the Load Planning System says the van can service the forced order, then the system will assign the order to the van and generate a move sequence. If the system says the order to van assignment will not work, the order is assigned to the van anyway, but the system suggested order or load assignment will be reconsidered.

ORDER IS REMOVED FROM A VAN

Whenever an order is removed from a van, replanning must take place. When the order is removed, space becomes available. The Local System must try to find available orders en route to fill this new space on the van. If the removal of the order emptied the van, then the van is first assigned the highest priority order in its current area, then the Local System will find an en route order to accompany the existing load.

The Load Planning System will try to find another van for the order which was removed. If the system cannot find a suitable van right away, then the order is added to the loose order list.

VAN IS OUT OF SERVICE

The first thing that the Local Systems do in the event of a van breakdown is to check when the van will again be available. If all order pick up and delivery deadlines can still be met, then no changes to the load plan are needed. If one or more pick ups or deliveries are in jeopardy, then the system will isolate those orders whose deadlines will be missed. The Local System will first try to find vans to service these endangered orders, one order at a time. If suitable vans cannot be located, then the orders will be placed in a planning list for the geographical area in which the breakdown occurred. In addition, pick-up and store notice will be issued for these detoured orders which could not be assigned to a van.

VAN IS DELAYED OR AHEAD OF SCHEDULE

When a van is delayed for reasons other than a van breakdown, the delay may be for a relatively small period of time, in which case no special processing is required. For longer delays of several days, the system for handling the delay would be the same as handling delay caused by a van breakdown.

If a van is ahead of schedule, it is treated just as if it were on schedule. If it has space available, the Load Planning System will try to find a suitable en route order for the van.

USER OVERRIDES REPOSITIONING SUGGESTION

When a user overrides a repositioning suggestion, then the Local System must handle this change in plan for repositioning capacity. First, the algorithms will try to find another empty van to replace the first van. If an empty van cannot be found, then the Local System will account for this change in the capacity allocation plan and do its best to service orders with the van capacity which is available.

GENERAL SYSTEM OPERATIONS

The system software includes routines for accessing the various modules and functions of the system. In particular, a menu system is provided by which various modules can be selected and operated.

CONCLUSION

Thus, the present invention provides a method and apparatus for use in moving orders throughout a geographic territory on a demand-scheduled basis. It is contemplated the invention has application to other problems requiring the movement of 3-dimensional loads, or even to the movement of signals or data through a network, through space or the like. Furthermore, it may be seen that the present invention provides for the efficient utilization of transportation resources, permitting a savings in fuel, equipment and personnel costs.

Although the invention has been described herein in its preferred form, those of skill in the art will recognize that many changes and modifications may be thereto without departing from the spirit and scope of the claims appended hereto.

APPENDIX A
A Demand Scheduled Partial Carrier Load Planning System
For the Transportation Industry
Data Requirements Memorandum This memorandum describes the data requirements of the demand scheduled partial carrier load planning system for the transportation industry (hereinafter Load Planning System). The data requirements include data elements, records, and relationships.

Data Elements and Records

Primary data elements are described in reference to the elements which are important to the planning process.

| Record | Description |
|---|---|
| Order Record | The order record contains all of the Load Planning information for a future order to be serviced or an order which is in the process of being serviced. When an order has been delivered and no longer has any service requirements, its order record is deleted and a similar record is created as a Historical Order Record. |
| Van Record | The van record contains all of the Load Planning information for a van. This includes current and forecasted location and movement information needed by the Load Planning System. |
| Bucket Record | One bucket record exists for each load in the system. The bucket records contain only key Load Planning information and are used to associate orders with their planned movement and locations. |
| Movement Record | Movement records are associated with a van. They detail how the van will move from location to location as it services orders, moves empty, and comes in or goes out of service. |
| Area Record | An area record defines the existence of a Load Planning System planning area. Each area which the model/system knows and potentially plans for will have an area record. |
| Tube Record | A tube record defines the existence of a Load Planning System tube. Each tube which the model/system might use for planning will h.ave a tube record. |
| Tube Data Record | A tube date record is used to sort the placement of orders into tubes by the date the order needs to be considered for planning (early load date). All orders for a single tube with the same early load date are thus grouped together. |
| Area Date Record | An area date record is used to sort the placement of orders into areas by the date the order needs to be considered for planning (early load date). All orders for a single area with the same early load date are thus grouped together. |
| Unplanned Order | An unplanned order record is used to associate orders which have not yet been planned with the early load date for the order. All orders which are unplanned with the same early load date are then easily accessible together. |
| Prediction Record | When the Load Planning System predicts that a van will be in certain areas or tubes on future dates, a prediction record is made for each area/date the van will be in. The prediction records are connected (related) to the tubes which the van would be in as it moves from each prediction to the next. |
| Van Statistics | The van statistics record is used to capture statistics about a specific van for a period of time. |
| Area Statistics | The area statistics record is used to capture statistics about an area for a period of time. |
| Global Statistics | The global statistics record captures statistics for the entire country for a period of time. |
| Tube Statistics | The tube statistics record is used to capture statistics for a specific tube for a period of time. |
| GP Record | This is a period record within the global database. This record allows the transportation, pick up and store van, and repositioning records to be associated with a specific period. |
| Transportation | The transportation record stores area imbalance information. Each excess or shortage area has a transportation record which indicates the amount of excess or shortage. This information is used as input in solving the transportation problem. |
| Pick Up and Store Van Record | The pick up and store van record indicates the volume and the number of orders that were pick up and store in the area in the previous period. This record also indicates the number and capacity of empty vans in an area at the beginning of the current period. The pick up and store van record is updated by the local algorithms each period. |
| Forecast Period | One forecast period record exists for each period. The forecast period record allows the database to be organized chronologically. |
| Area Period Record | Each area has an area period record within each chronological period. The record contains predicted and actual demand volume statistics. |
| Season Record | A season record exists for each season defined within the model. Currently, there are two seasons, busy and non busy season. |
| Area Season Record | For each area within a given season, this record maintains the demand volume average and standard deviation. Statistics are kept for both inbound and outbound demand. |
| Reposition Record | The repositioning record is used to store information about expected repositioning and to capture actual information when the repositioning has been completed. |
| Historical Order | After an order has been serviced, important fields from the order record and actual service information are copied to the historical order record before the order record is deleted. |

APPENDIX A
A Demand Scheduled Partial Carrier Load Planning System
For the Transportation Industry
Data Requirements Memorandum This memorandum describes the data requirements of the demand scheduled partial carrier load planning system for the transportation industry (hereinafter Load Planning System). The data requirements include data elements, records, and relationships.

Data Elements and Records

| | |
|---|---|
| Category 2 Van Statistics | Used to capture historical category 2 statistics |
| Matchinq Algorithm | Used to capture statistics measuring the performance of the Matching Algorithm in the Local Algorithms. |
| Historical Van Record | In addition to the van statistics already discussed, UVL must capture revenue and self-haul information on a per van basis. |

APPENDIX B
Data Element Definitions

Order Record

| | | |
|---|---|---|
| Order Number | | |
| | Booking Agent | Pic 9(5) |
| | Order Number | Pic 9(7) |
| | Order Year | Pic 9 |
| | Partial Shipment | Pic X |
| | Overflow Code | Pic X |
| | Split Haul Code | Pic X |
| Order Status | | Pic X |
| Registration Data | | Pic 9(9) |
| Early Load Date | | Pic 9(9) |
| Late Load Date | | Pic 9(9) |
| Actual Load Date | | Pic 9(9) |
| Early Delivery Date | | Pic 9(9) |
| Late Delivery Date | | Pic 9(9) |
| Actual Delivery Date | | Pic 9(9) |
| Pick up and Store | | Pic 9(9) |
| Critical Load Date | | Pic 9(9) |
| Origin State | | Pic X(2) |
| Origin City | | Pic X(15) |
| Origin Code | | Pic 9(2) |
| Longitude of Origin | | Pic 9(3)V99 |
| Latitude of Origin | | Pic 9(3)V99 |
| Destination State | | Pic X(2) |
| Destination City | | Pic X(15) |
| Destination Code | | Pic 9(2) |
| Longitude of Destination | | Pic 9(3)V99 |
| Latitude of Destination | | Pic 9(3)V99 |
| Weight | | Pic 9(5) |
| Cubes | | Pic 9(5) |
| Auto Weight | | Pic 9(5) |
| Bulky Items Weight | | Pic 9(5) |
| Tariff Miles | | Pic 9(5) |
| Estimated Revenue | | Pic 9(7)V99 |
| Load Planning Status Flag | | Pic X |
| Carried Van | | Pic X |
| Self Haul Agent-Van Destination | | |
| | Agent | Pic 9(5) |
| | Van | Pic X(3) |
| Assigned to Agent-Van Number | | |
| | Agent | Pic 9(5) |
| | Van | Pic X(3) |
| Partial Shipment must travel with HHG | | Pic X |
| Request to Haul Flag | | Pic X |
| Self Haul Flag | | Pic X |
| Pick up and Store | | Pic X |
| Pick up and Store | | Pic 9(9) |
| Pick up and Store | | Pic 9(5) |
| Storage in Transit code | | Pic X |
| Storage in Transit date | | Pic 9(9) |
| Storage in Transit Until (date) | | Pic 9(9) |
| Storage in Transit IT Agency | | Pic 9(5) |
| Order Priority | | Pic X |
| Origin Agent | | Pic 9(5) |
| Destination Agent | | Pic 9(5) |
| Origin Area | | |
| | Area index i | Pic 9(3) |
| | Area index j | Pic 9(3) |
| Destination Area | | |
| | Area index i | Pic 9(3) |
| | Area index j | Pic 9(3) |
| Tube | | |
| | Angle | Pic 9(3)V99 |
| | Corridor | Pic 9(3) |
| | Direction | Pic S9 |
| * En route Consolidation | | Pic X |

Van Record

| | | |
|---|---|---|
| Van-Agent Number | | |
| | Agent Number | Pic 9(5) |
| | Van Number | Pic X(3) |
| Van Type | | Pic X |
| Lease Type | | Pic X |
| Home Area Row Index | | Pic 9(3) |
| Home Area Column Index | | Pic 9(3) |
| Number of drivers | | Pic 9 |
| Van Status | | Pic X |
| Van Length | | Pic 99 |
| Total Capacity Cubes | | Pic 9(5) |
| Total Capacity Pounds | | Pic 9(5) |
| Available Capacity Cubes | | Pic 9(5) |
| Available Capacity Pounds | | Pic 9(5) |
| Move Date | | Pic 9(9) |
| Trigger Flag | | Pic X |
| Moving Flag | | Pic 9(5) |
| Used Category I van Flag | | Pic X |
| Empty Date | | Pic 9(9) |
| Least Breakdown Date | | Pic 9(9) |
| Next Breakdown Date | | Pic 9(9) |
| Start Latitude | | Pic 9(3)V99 |
| Start Longitude | | Pic 9(3)V99 |
| Start Date | | Pic 9(9) |
| Longitude of last call in | | Pic 9(3)V99 |
| Latitude of last call in | | Pic 9(3)V99 |
| Date of last call in | | Pic 9(9) |
| Longitude of next call in | | Pic 9(3)V99 |
| Latitude of next call in | | Pic 9(3)V99 |
| Date of next call in | | Pic 9(9) |
| Final Latitude | | Pic 9(3)V99 |
| Final Longitude | | Pic 9(3)V99 |
| Travel time from Last Call | | Pic 99 |
| Time for last Action (Pickup/delivery) | | Pic 99 |
| Waiting Time at Next location | | Pic 99 |
| Travel miles from Last Call | | Pic 99 |
| Van Priority | | Pic X |
| Days in Service | | Pic 9(3) |
| Driver number 1 driver number | | |
| | Agent Number | Pic 9(5) |
| | Driver Number | Pic 9(3) |
| Driver number 2 driver number | | |
| | Agent Number | Pic 9(5) |
| | Driver Number | Pic 9(3) |
| Van qualification flag | | Pic X |
| Tractor Number | | |
| | Agent Number | Pic 9(5) |
| | Tractor Number | Pic X(3) |
| Current Load Miles | | Pic 9(5) |
| Current Load Days | | Pic 99 |
| Current Load Revenue | | Pic |

APPENDIX B
Data Element Definitions

| | | |
|---|---|---|
| 9(7)V99 | | |
| | Previous Load Miles | Pic 9(5) |
| | Previous Load Days | Pic 99 |
| | Previous Load Revenue | Pic |
| 9(7)V99 | | |
| | 2nd Previous Load Days | Pic 99 |
| | 2nd Previous Load Revenue | Pic |
| 9(7)V99 | | |
| | 3rd Previous Load Miles | Pic 9(5) |
| | 3rd Previous Load Days | Pic 99 |
| | 3rd Previous Load Revenue | Pic |
| 9(7)V99 | | |
| | 4th Previous Load Miles | Pic 9(5) |
| | 4th Previous Load Days | Pic 99 |
| | 4th Previous Load Revenue | Pic |
| 9(7)V99 | | |
| Bucket Record | | |
| | Early Pickup Date | Pic 9(9) |
| | Late Pickup Date | Pic 9(9) |
| | Begin Latitude | Pic |
| 9(3)V99 | | |
| | Begin Longitude | Pic |
| 9(3)V99 | | |
| | End Latitude | Pic |
| 9(3)V99 | | |
| | End Longitude | Pic |
| 9(3)V99 | | |
| | Distance | Pic 9(5) |
| | Cubes | Pic 9(5) |
| | Weight | Pic 9(5) |
| | Order Count (in the load) | Pic 9(3) |
| | Load Priority | Pic X |
| Unplanned Order Record | | |
| | Order Load Date | Pic 9(9) |
| Movement Record | | |
| | Movement Date | Pic 9(9) |
| | Latitude | Pic |
| 9(3)V99 | | |
| | Longitude | Pic |
| 9(3)V99 | | |
| | Pickup/Delivery | Pic X |
| | Expected Arrival Date | Pic 9(9) |
| | Expected Arrival Hour | Pic 9(9) |
| | Expected Departure Date | Pic 9(9) |
| | Expected Departure Hour | Pic 9(9) |
| Area Record | | |
| | Area index | |
| | | Area index i | Pic 9(3) |
| | | Area index j | Pic 9(3) |
| | Longitude of area | Pic |
| 9(3)V99 | | |
| | Latitude of area | Pic |
| 9(3)V99 | | |
| | Excess of Shortage Area | Pic X |
| Tube Record | | |
| | Tube Index | |
| | | Angle | Pic |
| 9(3)V99 | | |
| | | Corridor | Pic 9(3) |
| | | Direction | Pic S9 |
| | Width | Pic 9(3) |
| Tube Date Record | | |
| | Tube Sort Date | Pic 9(9) |
| Area Date Record | | |
| | Area Sort Date | Pic 9(9) |
| Prediction Record | | |
| | Latitude | Pic |
| 9(3)V99 | | |
| | Longitude | Pic |
| 9(3)V99 | | |
| | Prediction Date | Pic 9(9) |
| | Fleet Code | Pic X |
| | Available Capacity - Pounds | Pic 9(5) |
| | Available Capacity - Cubes | Pic 9(5) |
| Van Statistics Record | | |
| | Period of Statistics | Pic 9(3) |
| | Begin Date of Statistics | Pic 9(9) |

APPENDIX B
Data Element Definitions

| | | |
|---|---|---|
| | End Date of Statistics | Pic 9(9) |
| | Days Idle | Pic 9(3) |
| | Days Broken | Pic 9(3) |
| | Time Spent Waiting | Pic 9(3) |
| | Time Spent Loading/Unloading | Pic |
| 9(6)V99 | | |
| | Actual Usage (Load * Miles) | Pic |
| 9(6)V99 | | |
| | Time Spent in Traveling | Pic |
| 9(6)V99 | | |
| Area Statistics Record | | |
| | Period of Statistics | Pic 9(3) |
| | Begin Date of Statistics | Pic 9(9) |
| | End Date of Statistics | Pic 9(9) |
| | Category I Empty Days | Pic 9(6) |
| | Category II Empty Days | Pic 9(6) |
| | Loading Days | Pic |
| 9(3)V99 | | |
| | Unloading Days | Pic |
| 9(3)V99 | | |
| | Empty Category I Vans In | Pic 9(6) |
| | Empty Category I Van capacity In - pounds | Pic 9(11) |
| | Empty Category I capacity In - cubes | Pic 9(11) |
| | Empty Category I at beginning of period | Pic 9(5) |
| | Empty Category I at end of period | Pic 9(5) |
| | Category II Vans Popped - Number | Pic 9(5) |
| | Category II Vans Popped - Pounds available | Pic 9(11) |
| | Category II Vans Popped - Cubes available | Pic 9(11) |
| | Category II Vans Passing - Number | Pic 9(5) |
| | Category II Vans Passing - Pounds | Pic 9(11) |
| | Category II Vans Passing - Cubes | Pic 9(11) |
| | Category II Vans Popped and Used - Number | Pic 9(5) |
| | Category II Vans Popped and Used - Pounds | Pic 9(11) |
| | Category II Vans Popped and Used - Cubes | Pic 9(11) |
| | Late Pickup - Number | Pic 9(5) |
| | Late Pickup - Pounds | Pic 9(11) |
| | Late Pickup - Cubes | Pic 9(11) |
| | Early Delivery - Number | Pic 9(5) |
| | Early Delivery - Pounds | Pic 9(11) |
| | Early Delivery - Cubes | Pic 9(11) |
| | Late Delivery - Number | Pic 9(5) |
| | Late Delivery - Pounds | Pic 9(11) |
| | Late Delivery - Cubes | Pic 9(11) |
| | Pick up and Store Long Distance Orders - Number | Pic 9(5) |
| | Pick up and Store Long Distance Orders - Pounds | Pic 9(11) |
| | Pick up and Store Long Distance Orders - Cubes | Pic 9(11) |
| | Pick up and Store Total Orders - Number | Pic 9(5) |
| | Pick up and Store Total Orders - Pounds | Pic 9(11) |
| | Pick up and Store Total Orders - Cubes | Pic 9(11) |
| | Unserviced Total Orders - Number | Pic 9(5) |
| | Unserviced Total Orders - Pounds | Pic 9(11) |
| | Unserviced Total Orders - Cubes | Pic 9(11) |
| | Unserviced Long Distance Orders - Number | Pic 9(5) |
| | Unserviced Long Distance Orders - Pounds | Pic 9(11) |
| | Unserviced Long Distance Orders - Cubes | Pic 9(11) |
| | Storage in Transit Orders - Number | Pic 9(5) |
| | Storage in Transit Orders - Pounds | Pic 9(11) |
| | Storage in Transit Orders - Cubes | Pic 9(11) |
| | Setoff Orders - Numbers | Pic 9(5) |
| | Setoff Orders - Pounds | Pic 9(11) |
| | Setoff Orders - Cubes | Pic 9(11) |
| | Tonnage In - Number | Pic 9(5) |
| | Tonnage In - Pounds | Pic 9(11) |
| | Tonnage In - Cubes | Pic 9(11) |
| | Tonnage Out - Number | Pic 9(5) |
| | Tonnage Out - Pounds | Pic 9(11) |
| | Tonnage Out - Cubes | Pic 9(11) |
| Tube Statistics Record | | |
| | Period of Statistics | Pic 9(3) |
| | Begin Date of Statistics | Pic 9(9) |

APPENDIX B
Data Element Definitions

| | | |
|---|---|---|
| | End Date of Statistics | Pic 9(9) |
| | Late Pickup - Number | Pic 9(5) |
| | Late Pickup - Pounds | Pic 9(11) |
| | Late Pickup - Cubes | Pic 9(11) |
| | Early Delivery - Number | Pic 9(5) |
| | Early Delivery - Pounds | Pic 9(11) |
| | Early Delivery - Cubes | Pic 9(11) |
| | Late Delivery - Number | Pic 9(5) |
| | Late Delivery - Pounds | Pic 9(11) |
| | Late Delivery - Cubes | Pic 9(11) |
| | Pick up and Store Total Orders - Number | Pic 9(5) |
| | Pick up and Store Total Orders - Pounds | Pic 9(11) |
| | Pick up and Store Total Orders - Cubes | Pic 9(11) |
| | Pick up and Store Long Distance Orders - Number | Pic 9(5) |
| | Pick up and Store Long Distance Orders - Pounds | Pic 9(11) |
| | Pick up and Store Long Distance Orders - Cubes | Pic 9(11) |
| | Unserviced Total Orders - Number | Pic 9(5) |
| | Unserviced Total Orders - Pounds | Pic 9(11) |
| | Unserviced Total Orders - Cubes | Pic 9(11) |
| | Unserviced Long Distance Orders - Number | Pic 9(5) |
| | Unserviced Long Distance Orders - Pounds | Pic 9(11) |
| | Unserviced Long Distance Orders - Cubes | Pic 9(11) |
| | Storage in Transit Orders - Number | Pic 9(5) |
| | Storage in Transit Orders - Pounds | Pic 9(11) |
| | Storage in Transit Orders - Cubes | Pic 9(11) |
| | Setoff Orders - Numbers | Pic 9(5) |
| | Setoff Orders - Pounds | Pic 9(11) |
| | Setoff Orders - Cubes | Pic 9(11) |
| | Tonnage In - Number | Pic 9(5) |
| | Tonnage In - Pounds | Pic 9(11) |
| | Tonnage In - Cubes | Pic 9(11) |
| | Tonnage Out - Number | Pic 9(5) |
| | Tonnage Out - Pounds | Pic 9(11) |
| | Tonnage Out - Cubes | Pic 9(11) |
| | Loads Formed - Number | Pic 9(5) |
| | Loads Formed - Order Count | Pic 9(5) |
| | Loads Formed - Pounds | Pic 9(11) |
| | Loads Formed - Cubes | Pic 9(11) |
| | Loads Broken - Number | Pic 9(5) |
| | Loads Broken - Order Count | Pic 9(5) |
| | Loads Broken - Pounds | Pic 9(11) |
| | Loads Broken - Cubes | Pic 9(11) |
| Global Statistics Record | | |
| | Period of Statistics | Pic 9(3) |
| | Begin Date of Statistics | Pic 9(9) |
| | End Date of Statistics | Pic 9(9) |
| | Category I Orders - Number | Pic 9(5) |
| | Category I Orders - Pounds | Pic 9(11) |
| | Category I Orders - Cubes | Pic 9(11) |
| | Category I Tonnage Miles | Pic 9(11)V99 |
| | Category I Possible Tonnage Miles | Pic 9(11)V99 |
| | Category II Orders - Number | Pic 9(5) |
| | Category II Orders - Pounds | Pic 9(11) |
| | Category II Orders - Cubes | Pic 9(11) |
| | Category II Capacity - Number | Pic 9(5) |
| | Category II Capacity - Pounds | Pic 9(11) |
| | Category II Capacity - Cubes | Pic 9(11) |
| | Late Pickup - Number | Pic 9(5) |
| | Late Pickup - Pounds | Pic 9(11) |
| | Late Pickup - Cubes | Pic 9(11) |
| | Early Delivery - Number | Pic 9(5) |
| | Early Delivery - Pounds | Pic 9(11) |
| | Early Delivery - Cubes | Pic 9(11) |
| | Late Delivery - Number | Pic 9(5) |
| | Late Delivery - Pounds | Pic 9(11) |
| | Late Delivery - Cubes | Pic 9(11) |
| | Pick up and Store Total Orders - Number | Pic 9(5) |
| | Pick up and Store Total Orders - Pounds | Pic 9(11) |
| | Pick up and Store Total Orders - Cubes | Pic 9(11) |
| | Pick up and Store Long Distance Orders - Number | Pic 9(5) |
| | Pick up and Store Long Distance Orders - Pounds | Pic 9(11) |
| | Pick up and Store Long Distance Orders - Cubes | Pic 9(11) |
| | Unserviced Total Orders - Number | Pic 9(5) |
| | Unserviced Total Orders - Pounds | Pic 9(11) |
| | Unserviced Total Orders - Cubes | Pic 9(11) |
| | Unserviced Long Distance Orders - Number | Pic 9(5) |
| | Unserviced Long Distance Orders - Pounds | Pic 9(11) |
| | Unserviced Long Distance Orders - Cubes | Pic 9(11) |
| | Storage in Transit Orders - Number | Pic 9(5) |
| | Storage in Transit Orders - Pounds | Pic 9(11) |
| | Storage in Transit Orders - Cubes | Pic 9(11) |
| | Setoff Orders - Numbers | Pic 9(5) |
| | Setoff Orders - Pounds | Pic 9(11) |
| | Setoff Orders - Cubes | Pic 9(11) |
| | Tonnage In - Number | Pic 9(5) |
| | Tonnage In - Pounds | Pic 9(11) |
| | Tonnage In - Cubes | Pic 9(11) |
| | Tonnage Out - Number | Pic 9(5) |
| | Tonnage Out - Pounds | Pic 9(11) |
| | Tonnage Out - Cubes | Pic 9(11) |
| Options Record | | |
| | Option Code | Pic XX |
| | Number of Miles Allowed | Pic 9(5) |
| | Interline Allowed Flag | Pic X |
| | Return Tonnage allowed flag | Pic X |
| Misc. Parameter Record | | |
| | Parameter Key | Pic XXX |
| | Area Index | |
| |     Area index i | Pic 9(3) |
| |     Area index j | Pic 9(3) |
| | Tube Index | |
| |     Angle | Pic 9(3)V99 |
| |     Corridor | Pic 9(3) |
| |     Direction | Pic S9 |
| | Parameter Value | Pic X(80) |
| | Parameter Use (documentation) | Pic X(80) |
| Transportation Record | | |
| | Area index i | Pic 9(3) |
| | Area index j | Pic 9(3) |
| | Latitude | Pic 9(3)V99 |
| | Longitude | Pic 9(3)V99 |
| | Excess or Short (cubes or pounds) | Pic 9(11) |
| | Excess or Shortage Code | Pix X |
| Pick up and Store Van Record | | |
| | Area index i | Pic 9(3) |
| | Area index j | Pic 9(3) |
| | Pick up and store volume | Pic 9(11) |
| | Pick up and store number | Pic 9(5) |
| | Empty Van Capacity | Pic 9(5) |
| | Number of Empty Vans | Pic 9(5) |
| Forecast Period Record | | |
| | Period Number | Pic 9(3) |
| | Period Begin Date | Pic 9(9) |
| Area Period Record | | |
| | Area index i | Pic 9(3) |
| | Area index j | Pic 9(3) |
| | Predicted inbound f ratio | Pic 99V9(3) |
| | Predicted outbound f ratio | Pic 99V9(3) |
| | Actual inbound f ratio | Pic 99V9(3) |
| | Actual outbound f ratio | Pic 99V9(3) |
| | Registered outbound volume | Pic 9(11) |
| | Unregistered outbound volume | Pic 9(11) |
| | Registered inbound volume | Pic 9(11) |
| | Unregistered outbound volume | Pic 9(11) |
| | Predicted unregistered outbound volume | Pic 9(11) |
| | Predicted unregistered inbound volume | Pic 9(11) |

APPENDIX B
Data Element Definitions

Season Record
    Season index      Pic 99
Area Season Record
    Area index i      Pic 9(3)
    Area index j      Pic 9(3)
    Outbound demand mean      Pic 9(11)V99
    Outbound demand standard deviation      Pic 9(11)V99
    Inbound demand mean      Pic 9(11)V99
    Inbound demand standard deviation      Pic 9(11)V99
Repositioning Record
    From Area Index
        Area index i      Pic 9(3)
        Area index j      Pic 9(3)
    To Area Index
        Area index i      Pic 9(3)
        Area index j      Pic 9(3)
    Expected Empty Capacity      Pic 9(9)V99
    Expected Full Capacity      Pic 9(9)V99
    Actual Empty Capacity      Pic 9(9)V99
    Actual Full Capacity      Pic 9(9)V99
    Actual Units Full      Pic 9(5)
Historical Order Record
    Order Number
        Booking Agent      Pic 9(5)
        Order Number      Pic 9(7)
        Order Year      Pic 9
        Bulky Item      Pic X
        Overflow Code      Pic X
        Split Haul Code      Pic X
    Order Status      Pic X
    Registration Date      Pic 9(9)
    Early Load Date      Pic 9(9)
    Late Load Date      Pic 9(9)
    Actual Load Date      Pic 9(9)
    Early Delivery Date      Pic 9(9)
    Late Delivery Date      Pic 9(9)
    Actual Delivery Date      Pic 9(9)
    Weight      Pic 9(5)
    Cubes      Pic 9(5)
    Auto Weight      Pic 9(5)
    Bulky Items Weight      Pic 9(5)
    Tariff Miles      Pic 9(5)
    Estimated Revenue      Pic 9(7)V99
    Load Planning Status Flag      Pic X
    Partial Shipment must ravel with HHG      Pic X
    Origin State      Pic X(2)
    Origin City      Pic X(15)
    Longitude of Origin      Pic 9(3)V99
    Latitude of Origin      Pic 9(3)V99
    Destination State      Pic X(2)
    Destination City      Pic X(15)
    Longitude of Destination      Pic 9(3)V99
    Latitude of Destination      Pic 9(3)V99
    Request to Haul Flag      Pic X
    Self-Haul Agent-Van Designation
        Agent      Pic 9(5)
        Van      Pic X(3)
    Assigned to Agent-Van Number
        Agent      Pic 9(5)
        Van      Pic X(3)
    Storage in Transit Code      Pic X
    Storage in Transit DATE      Pic 9(9)
    Storage in Transit Until (date)      Pic 9(9)
    Storage in Transit Agency      Pic 9(5)
    Order Type      Pic X
    Order Priority      Pic X
    Carried Van      Pic X
    Move To Tube Days      Pic 9(3)V99
    Move From Tube Days      Pic 9(3)V99
    Origin Agent      Pic 9(5)
    Destination Agent      Pic 9(5)
    Origin Area
        Area index i      Pic 9(3)
        Area index j      Pic 9(3)
    Destination Area
        Area index i      Pic 9(3)
        Area index j      Pic 9(3)
    Tube
        Angle      Pic 9(3)V99
        Corridor      Pic 9(3)
        Direction      Pic S9
    En Route Consolidation      Pic X
Category II Van Statistics Record
    Van ID
        Agent Number      Pic 9(5)
        Van Number      Pic X(3)
    Call-in Date      Pic 9(9)
    Availability Begin Date      Pic 9(9)
    Availability Wait Time (days)      Pic 999
    Origin Area Index
        Area index i      Pic 9(3)
        Area index j      Pic 9(3)
    Destination Area Index
        Area index i      Pic 9(3)
        Area index j      Pic 9(3)
    Available Capacity (pounds)      Pic 9(11)
    Available Capacity (cubes)      Pic 9(11)
Matching Algorithm Record
    Date      Pic 9(9)
    Area index i      Pic 9(3)
    Area index j      Pic 9(3)
    Empty Van Count Before      Pic 9(4)
    Empty Van Capacity Before (cubes)      Pic 9(11)
    Empty Van Count After      Pic 9(4)
    Empty Van Capacity After (cubes)      Pic 9(11)
Historical Van Record
    Period of Statistics      Pic 9(3)
    Period Begin Date      Pic 9(9)
    Period End Date      Pic 9(9)
    Van ID
        Agent      Pic 9(5)
        Van      Pic X(3)
    Request to Self-Haul count      Pic 9(3)
    Total Tonnage (cubes)      Pic 9(7)
    Self-Haul Tonnage (cubes)      Pic 9(7)
    Total Revenue      Pic 9(7)
    Days Idle      Pic 9(3)
    Days Broken      Pic 9(3)
    Time Spent Waiting      Pic 9(3)
    Time Spent Loading/Unloading      Pic 9(6)V99
    Actual Usage (Load * Miles)      Pic 9(6)V99
    Time Spent in traveling      Pic 9(6)V99
    Utilization Weight      Pic 9(6)V99
    Utilization No Weight      Pic 9(6)V99
    Utilization Distance      Pic 9(6)V99

APPENDIX C
RELATIONSHIPS

The records described above are all related through one or more of the fields on each record. How each record is related to other records is described graphically in the logical database design which follows. Like fields in the related records would be used to access them. Of course, in different embodiments of these relationships, other methods can be used.

| | OWNER | MEMBER | CRITERIA | INSERT/ORDER |
|---|---|---|---|---|
| 1 | System | Global Statistics | All global statistics records are members | Last |
| 2 | System | Order Record | All orders with origins or destinations outside the United States are members | Next |
| 3 | System | Order Record | All Storage in Transit orders are members | Next |
| 4 | System | Order Record | All non household good orders are members | Next |
| 5 | System | Order Record | All orders which do not fit on a van are members | Next |
| 6 | System | Order Record | All orders which have been planned are members | First |
| 7 | System | Unplanned Order | All unplanned orders are members | Ascending by sort date |
| 8 | Unplanned Order | Order Record | Orders which have not been planned are associated with an unplanned order record based on load date | Last |
| 9 | System | Order Record | All unserviced orders are members | Next |
| 10 | System | Tube Record | All tube records are members | Last |
| 11 | System | Area Record | All area records are members | Last |
| 12 | System | Van Record | All Category I van records are members | First |
| 13 | System | Van Record | All Category II van records are members | First |
| 14 | Tube Record | Tube Statistics | Each tube statistics record is associated with the tube record for which the statistics are being captured | Last |
| 15 | Tube Record | Tube Date Record | Each tube date record is associated with its tube record | Ascending based on a date |
| 16 | Tube Date Record | Order Record | Orders are associated with the tube date record in the tube the order would travel on the early pickup date | Last |
| 17 | Area Record | Area Statistics | Each area statistics record is associated with the area record for which the statistics are being captured | Last |
| 18 | Area Record | Area Date Record | Each area date record is associated with its area record | Ascending based on a date |
| 19 | Area Date Record | Order Record | Orders are associated with the area date record in the origin area for this order on the early pick-up date | Last |
| 20 | Area Record | Order Record | Orders are associated with their destination area | Last |
| 21 | Area Date Record | Bucket Record | Each bucket record is associated with an area date record based on its early load date and origin area | Descending based on the volume of the load |
| 22 | Area Record | Bucket Record | Each bucket is associated with the area date record in the destination area on the early delivery date | Last |
| 23 | Tube Date Record | Bucket Record | Each bucket record is associated with a tube date record based on its early load date and the tube the order is in | Descending based on the volume of the load |
| 24 | Order Record | Movement Record | Each planned order is associated with a movement record for its pickup and delivery | Descending based on the action (pickup or delivery) |
| 25 | Van Record | Van Statistics | Each van statistics record is associated with a specific van for which the statistics are captured | Last |
| 26 | Van Record | Movement Record | Each movement record is associated with the van that will perform the movement | Next |
| 27 | Bucket Record | Movement Record | Each movement record corresponding to a pickup or delivery is associated with the bucket record for the order being picked up or delivered | Next |
| 28 | Area | Van | Each Category I | Last |

APPENDIX C
RELATIONSHIPS

The records described above are all related through one or more of the fields on each record. How each record is related to other records is described graphically in the logical database design which follows. Like fields in the related records would be used to access them. Of course, in different embodiments of these relationships, other methods can be used.

| | OWNER | MEMBER | CRITERIA | INSERT/ORDER |
|---|---|---|---|---|
| | Record | Record | is associated with the area in which it will next be empty | |
| 29 | Area Record | Van Record | Each Category II is associated with the area in which it will next be empty | Last |
| 30 | Tube Record | Van Record | Each van is associated with the primary tube that it will travel in | Next |
| 31 | Van Record | Prediction Record | Each prediction record is associated with a specific van | Last |
| 32 | Tube Record | Prediction Record | Each prediction record is associated with a tube that the van is predicted to be in on a future date | Next |
| 33 | Area Record | Prediction Record | Each prediction record is associated with an area that the van is predicted to be in on a future date | Next |
| 34 | Order Record | Order Record | Base orders which have car orders associated with them | Last |
| 35 | Van Record | Bucket Record | Associates a load with a van chosen from local prediction Table to haul the load | First |
| 36 | Van Record | Order Record | Order records of loads hauled by vans obtained from local prediction tables | First |
| 37 | Van Record | Bucket Record | Each load is associated with a self-haul van which will haul the load | First |
| 38 | Van Record | Order Record | Order records of loads hauled by self-haul vans | Last |
| 39 | System | GP Record | All global period records are members | Ascending by period number |
| 40 | GP Record | Transportation Record | Excess and shortage areas are associated with a time period | First |
| 41 | GP Record | Repositioning Record | Repositioning records are associated with a time period | Descending by expected units empty |
| 42 | GP Record | Pick up and Store Van Record | Pick up and store information and empty van capacity are associated with a time period | Last |
| 43 | System | Forecast Period | There is one forecast period record for each chronological period in the database | First |
| 44 | Forecast Period | Area Period | Each area period record is associated with a forecast period | First |
| 45 | System | Season | All season records are members | First |
| 46 | Season | Area Season | A season record is associated vith each area | First |

We claim:

1. An apparatus for determining instructions for moving a plurality of orders in a geographic territory using a single carrier, each said order having an independent origin and destination point in said territory, said plurality of orders being selected from a larger pool of orders in the territory, said apparatus comprising:
   a) means specifying a data representation of an artificial network containing a plurality of vectorized shipping paths in the territory;
   b) means for entering order data to form order records, each order record defining an order;
   c) means for organizing and accessing a plurality of order records defining said pool of orders;
   d) means for determining a vector representation of the path from the origin to the destination for each order in said pool;
   e) means for matching the vector representations of the order paths to one or more of said vectorized shipping paths of the data representation;
   f) means for selecting from the matches a group of order records corresponding to orders that can be carried by a single carrier between their respective origins and destinations;
   g) means for determining move sequence instructions for the carrier to pick up and deliver the orders corresponding to the selected order records; and
   h) means for reporting said move sequence instructions.

2. An apparatus according to claim 1 wherein the vectorized shipping paths each have a certain width encompassing a swath across the territory, with the width being specified in said data representation.

3. An apparatus according to claim 1 wherein the data representation of the vectorized shipping paths specifies non-overlapping or substantially non-overlapping paths.

4. An apparatus according to claim 1 wherein the vectorized shipping paths are oriented at a plurality of angles with respect to a common frame of reference in the territory, with the orientation specified in said data representation.

5. An apparatus according to claim 1 wherein the data representation of the vectorized shipping paths specifies time-space tubes comprising:
i) tubes oriented at a plurality of angles with respect to a common reference frame in the territory, and
j) tubes having a width defining a swath across the territory, and a direction.

6. An apparatus according to claim 5 wherein the data representation of the vectorized shipping paths contains an angle parameter designating the angle of the tube with respect to the common reference frame, a corridor parameter designating the relative orientation of the tube with respect to other tubes of the same angle but covering different swaths, and a direction parameter indicating a direction of travel in the tube.

7. An apparatus according to claim 1 further comprising:
i) means defining a further data representation of a plurality of local areas in the geographic territory;
j) means for matching the origin points of orders in said pool of orders to said local areas; and
k) means for selecting the orders in said group according to the additional criteria of matches to the same or nearby local areas.

8. An apparatus according to claim 1 further comprising:
i) means defining a further data representation of a plurality of local areas in the geographic territory and the loads carried by the carriers;
j) means for maintaining a carrier position record of when a loaded carrier will be or is passing through a particular local area other then the originating area; and
k) means responsive to the carrier position record and the further data representation to produce instructions for assigning an order originating in said particular local area to a loaded carrier passing therethrough provided the carrier is travelling along a path corresponding to the path of the order and there is room for the order on the carrier, and for reporting the assignment instructions to the user.

9. An apparatus according to claim 8 further wherein said means for assigning includes means for assigning orders originating in the particular local area to a loaded carrier passing therethrough provided the carrier is travelling in an adjacent or nearly adjacent vectorized shipping paths, and provided that there is room for the order on the carrier.

10. For use with a system for moving a plurality of individual orders from one point to another in a geographic territory using a single carrier, wherein the orders each have an independent origin and destination point in said territory and are to be carried in the same general direction, an apparatus for selecting the individual orders from a pool of orders and providing instructions to a user for consolidating the selected orders into a carrier load for transport, comprising:
a) means for identifying from the order records those orders in the pool which are greater than a certain minimum size;
b) means for grouping certain orders into carrier loads with the constraint that the group must form a carrier load above a certain minimum size and below the capacity limit of the carrier;
c) means for reporting instructions for moving the loads in the group using the carrier,
d) means for maintaining a record of when the carrier will be or is passing through a particular local area other than the originating area; and
e) means for producing instructions to assign an additional load originating in the particular local area other than the originating area to be loaded carrier passing therethrough, provided the carrier is travelling along a path corresponding to the path of the load and there is room for the load on the carrier, and for reporting the instructions to a user.

11. For use with a system for moving a plurality of orders from one point to another in a geographic territory using a carrier fleet, wherein each said order has an independent origin and destination point in said territory, and the carriers move from one area to another in the territory when moving the order, an apparatus for providing instructions for correcting imbalances in the supply and demand for carriers in local areas of the territory, comprising:
a) means defining a plurality of local areas in the territory;
b) means for maintaining a record of the position of empty carriers in each local area;
c) means for specifying local areas where there is a shortage or is likely to be a shortage of carriers to move loads from origins in the areas, and means for identifying local areas where there is an excess of carriers or is likely to be an excess of carriers to move loads from origins in the areas; and
d) means for determining instructions for when to move empty carriers from local areas of excess carriers to areas of shortage comprising:
i) means for forecasting the inbound and outbound order volume for a given area over a given time interval,
ii) means for forecasting the availability of empty carriers in the given area during the same time interval, and
iii) means for reporting instructions on which empty carriers to reposition from areas of excess carriers to areas with a shortage of carriers.

12. An apparatus according to claim 11 further comprising means for forecasting and reporting the availability of partially empty carriers.

13. An apparatus according to claim 11 further comprising means for reserving loads in the areas of carrier shortage for each empty carrier being repositioned to said area of shortage.

14. For use with a system for moving a plurality of individual orders from one point to another in a geographic territory using a single carrier, wherein the orders each have an independent origin and destination point in said territory and are to be carried in the same general direction, and have origins in the same general area, an apparatus for selecting the individual orders from a pool of orders and providing instructions for consolidating the selected orders into a carrier load, and for transporting the consolidated orders, comprising:
a) means for specifying data representation of an artificial network containing a plurality of vectorized shipping paths in the territory and means specifying order records for the orders for each shipping path;
b) means for searching the order records and identifying those orders in the pool which are greater than a certain minimum size;
c) means for grouping certain identified orders into a carrier load with the constraint that the group must form a carrier load above a certain minimum size and below the capacity limit of the carrier; and d) means for reporting instructions for moving the carrier load using the carrier.

15. An apparatus according to claim 14 further wherein the system further includes additional carriers and the apparatus further includes:

e) means for forming as many carrier loads as possible from the identified orders, given the size and capacity constraints for the carriers.

16. An apparatus according to claim 15 further including means for reducing the certain minimum size for purposes of identifying orders in the pool, once as many carrier loads as possible are formed, to identify additional orders in the pool to be grouped into carrier loads.

17. An apparatus according to claim 15 further comprising:

e) means for classifying loads by priority; and f) means for first looking for groupings of orders according to the priority of orders.

18. An apparatus according to claim 14 further comprising:

e) means for classifying loads by priority; and f) means for first looking for groupings of orders each at the highest priority level, then for groups formed from orders at the highest and the next lowest priority, then for groups formed from orders at the highest, next to highest, and third highest priority, and so on.

19. An apparatus according to claim 14 further comprising:

e) means for classifying the orders according to the distance of the transport of the order from origin to destination; and f) means for grouping orders according to the distance, with the highest priority given to the orders of the greatest distance.

20. An apparatus according to claim 14 further comprising:

e) means for grouping orders into loads according to their general direction of travel;

f) means for grouping orders into loads according to their geographic proximity to each other; and g) means for grouping orders into loads such that the carrier pick up sequence minimizes total distance travelled.

21. An apparatus according to claim 15 whereby the means for assigning loads to carriers, further comprising:

f) means for grouping loads according to pick up date;

g) means for grouping loads according to area;

h) means for maintaining a record of orders that are not assigned to a load; and i) means for reporting instructions for assigning loads to empty carriers in the area where the loads are located.

22. An apparatus according to claim 21 further comprising means for generating instructions for assigning loads to carriers that are predicted to arrive in the area where the loads are located.

23. An apparatus according to claim 21 further comprising means for generating instructions for assigning loads to carriers that are predicted to pass through the area where the loads are located, provided that the carrier has room for the load.

24. An apparatus according to claim 21 further comprising means for generating instructions for assigning loads to carriers that are predicted to pass through the area where the order is located, provided that the carrier has room for the load.

25. A method for moving a plurality of orders in a geographic territory using a single carrier, each said order having an independent origin and destination point in said territory, said plurality of orders being selected from a larger pool of orders in the territory, comprising the steps of:

1) operating a computer to perform the steps of:

a) maintaining a definition on an artificial network in the territory comprising a plurality of vectorized shipping paths;

b) determining a vector representation of the path from the origin to the destination for each order in said pool;

c) matching the vector representations of the order paths to corresponding ones of said vectorized shipping paths;

d) selecting from the matches a group of orders that can be carried out by a single carrier between their respective origins and destinations;

e) determining a move sequence for the carrier specifying the pick up and delivery of orders; and 2) moving the group of orders using the carrier in accordance with the move sequence.

26. A method according to claim 25 wherein the vectorized shipping paths each have a certain width encompassing a swath across the territory.

27. A method according to claim 25 wherein the vectorized shipping paths are non-overlapping or substantially non-overlapping.

28. A method according to claim 25 wherein the vectorized shipping paths are oriented at a plurality of angles with respect to a common frame of reference in the territory.

29. A method according to claim 25 wherein the vectorized shipping paths define time-space tubes, comprising:

f) tubes oriented at a plurality of angles with respect to a common reference frame in the territory; and g) tubes having a width defining a swath across the territory, and a direction.

30. A method according to claim 29 wherein the tubes are indexed by an angle parameter designating the angle of the tube with respect to the common reference frame, a corridor parameter designating the relative orientation of the tube with respect to other tubes of the same angle but covering different swaths, and a direction parameter indicating a direction of travel in the tube.

31. A method according to claim 25 further comprising the steps of:

f) defining a plurality of local areas in the geographic territory;

g) matching the origin points of orders in said pool of orders to the local areas; and h) selecting the orders in said group according to the additional criteria of matches to the same or nearby local areas.

32. A method according to claim 25 further comprising the steps of:

f) defining a plurality of local areas in the geographic territory;

g) maintaining a record of when a carrier will be or is passing through a particular local area; and h) assigning a order originating in the particular local area to a loaded carrier passing therethrough provided the carrier is travelling along a path corresponding to the path of the order and there is room for the order on the carrier.

33. A method according to claim 32 further comprising assigning orders originating in the particular local area to a loaded carrier passing therethrough provided the carrier is travelling in an adjacent or nearly adjacent vectorized shipping paths and there is room for the order on the carrier.

34. In a system for moving a plurality of individual orders from one point to another in a geographic territory using a single carrier, wherein the orders each have an independent origin and destination point in said territory and are to be carried in the same general direction, a method for selecting the individual orders from a pool of orders, consolidating the selected orders for a carrier load, and transporting the consolidated orders, comprising the steps of:

1) operating a computer to perform the step of:
  a) maintaining a record of said orders in said pool;
  b) identifying those orders in the pool which are greater than a certain minimum size;
  c) grouping certain orders into carrier loads with the constraint that the group must form a carrier load above a certain minimum size and below the capacity limit of the carrier;

2) moving the loads in the group using the carrier; and 3) further operating the computer to perform the steps of:
  a) maintaining a record of when the carrier will be or is passing through a particular local area other than the originating area; and
  b) assigning a load originating in the particular local area to a loaded carrier passing therethrough provided the carrier is travelling along a path corresponding to the path of the load and there is room for the load on the carrier.

35. In a system for moving a plurality of orders from one point to another in a geographic territory using a carrier fleet, wherein each said order has an independent origin and destination point in said territory, and the carriers move from one area to another in the territory when moving the order, a method for correcting imbalances in the supply and demand for carriers in local areas of the territory, comprising the steps of:

1) operating a computer to perform the steps of:
  a) maintaining a definition of a plurality of local areas in the territory;
  b) maintaining a record of the position of empty carriers in each local area;
  c) identifying local areas where there is a shortage or is likely to be a shortage of carriers to move loads from origins in the areas, and identifying local areas where there is an excess of carriers or is likely to be an excess of carriers to move loads from origins in the areas; and
  d) determining instructions for movement of empty carriers from local areas of excess carriers to areas of shortage according to the following criteria;
    i) forecasting the inbound and outbound order volume for a given area over a given time interval;
    ii) forecasting the availability of empty carriers in the given area during the same time interval; and
    iii) repositioning empty carriers from areas of excess carriers to areas with a shortage of carriers;

2) moving empty carriers from local areas of excess carriers to areas of shortage according to said instructions.

36. A method according to claim 35 further wherein the availability of partially empty carriers is forecast.

37. A method according to claim 35 further wherein loads are reserved in the areas of carrier shortage for each empty carrier being repositioned to said area of shortage.

38. In a system for moving a plurality of individual orders from one point to another in a geographic territory using a single carrier, wherein the orders each have an independent origin and destination point in said territory, are to be carried in the same general direction, and have origins in the same general area, a method for selecting the individual orders from a pool of orders, consolidating the selected orders into a carrier load, and transporting the consolidated orders, comprising the steps of:

1) operating a computer to perform the steps of:
  a) specifying a data representation of an artificial network containing a plurality of vectorized shipping paths in the territory and maintaining a record of orders in said pool for each shipping path;
  b) identifying those orders in the pool which are greater than a certain minimum size;
  c) grouping certain identified orders into a carrier load with the constraint that the group must form a carrier load above a certain minimum size and below the capacity limit of the carrier; and 2) moving the load in the group using the carrier.

39. A method according to claim 38 further comprising:
  d) providing additional carriers; and
  e) forming as many carrier loads as possible from the identified orders, given the size and capacity constraints for the carriers.

40. A method according to claim 39 further including the step of reducing the certain minimum size for the purpose of identifying orders in the pool once as many carrier loads as possible are formed to identify additional orders in the pool to be grouped into carrier loads.

41. A method according to claim 38 further wherein loads are classified by priority, and the method further comprising first looking for groupings of orders according to the priority of orders.

42. A method according to claim 38 further wherein loads are classified by priority, and the method further comprising first looking for groupings of orders each at the highest priority level, then for groups formed from orders at the highest and the next lowest priority, then for groups formed from orders at the highest, next to highest, and third highest priority and so on.

43. A method according to claim 38 further wherein the orders are classified according to the distance of the transport of the order from origin to destination, and wherein the method further comprising the step of grouping orders according to the distance, with the highest priority given to the orders of the greatest distance.

44. A method according to claim 38 further wherein the method includes the steps of:
- d) grouping orders into loads according to their general direction of travel;
- e) further grouping orders into loads according to their geographic proximity to each other; and
- f) further grouping orders into loads such that the carrier pick up sequence minimizes total distance travelled.

45. A method according to claim 39 further wherein loads are assigned to carriers according to the following steps:
- d) grouping loads according to pick up date;
- e) further grouping loads according to area;
- f) maintaining a record of orders that are not assigned to a load; and
- g) assigning loads to empty carriers in the area where the loads are located.

46. A method according to claim 45 wherein loads are assigned to carriers predicted to arrive in the area where the loads are located.

47. A method according to claim 45 wherein loads are assigned to carriers predicted to pass through the area where the loads are located provided that the carrier has room for the load.

48. A method according to claim 45 wherein orders not assigned to a load are assigned to carriers predicted to pass through the area where the order is located provided that the carrier has room for the load.

* * * * *

UNITED STATES PATENT AND TRADEMARK OFFICE
CERTIFICATE OF CORRECTION

PATENT NO. : 5,265,006

DATED : November 23, 1993

INVENTOR(S) : Ajay K. Asthana et al.

It is certified that error appears in the above-identified patent and that said Letters Patent is hereby corrected as shown below:

In column 3, line 47, "associate" should read --associated--.

In column 7, lines 50-51, "(1,-1,-1)" should read --(1,-1,+1)--.

In column 15, line 30, delete "$C_{ij}$" after "F1".

In column 15, line 31, insert "$C_{ij}$" after "F2".

In column 15, line 32, delete "150" in W4 column and insert --150-- in F's Capacity column.

In column 16, lines 66-67, "Fi" should read --$F_1$--.

In column 17, lines 30, delete "50" under the word "capacity", and insert --50-- under "W4".

In column 19, line 25, "$F_2W_3$" should read --$F_3W_3$--.

In column 20, line 42, "±50" should read --+50--.

In column 21, line 6, "±50" should read --+50--.

In column 22, line 1, insert --the-- after "solve".

In column 22, line 18, "$u_i$" should read --$u_1$--.

In column 22, line 61, delete "50" under "W3"; insert --50-- under "W4".

In column 22, line 63, delete "250" under "W3"; delete "10" under "W4".

In column 31, line 54, "h.ave" should read --have--.

In column 35, line 8, insert --2nd Previous Load Miles    Pic 9 (5)-- after the letters "9(7)V99".

UNITED STATES PATENT AND TRADEMARK OFFICE
CERTIFICATE OF CORRECTION

PATENT NO. : 5,265,006

DATED : November 23, 1993

INVENTOR(S) : Ajay K. Asthana et al.

It is certified that error appears in the above-identified patent and that said Letters Patent is hereby corrected as shown below:

In column 43, line 44, "Table" should read --table--.

In column 46, line 6, "be" should read --a--.

Signed and Sealed this

Twenty-first Day of June, 1994

*Attest:*

BRUCE LEHMAN

*Attesting Officer*      *Commissioner of Patents and Trademarks*